(12) United States Patent
Aota et al.

(10) Patent No.: US 8,243,372 B2
(45) Date of Patent: Aug. 14, 2012

(54) OPTICAL APPARATUS AND OPTICAL TRANSMISSION APPARATUS

(75) Inventors: Hirofumi Aota, Kawasaki (JP); Kohei Shibata, Kawasaki (JP); Tamotsu Akashi, Kawasaki (JP); Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 559 days.

(21) Appl. No.: 12/356,806

(22) Filed: Jan. 21, 2009

(65) Prior Publication Data
US 2009/0290223 A1 Nov. 26, 2009

(30) Foreign Application Priority Data
May 22, 2008 (JP) .................. 2008-134432

(51) Int. Cl.
*G02B 9/08* (2006.01)
(52) U.S. Cl. ........................ 359/738; 359/739
(58) Field of Classification Search .......... 359/726–732, 359/738–740
See application file for complete search history.

(56) References Cited

U.S. PATENT DOCUMENTS

| 4,904,068 | A | * | 2/1990 | Tatsuno et al. ................ 359/559 |
| 6,456,575 | B1 | | 9/2002 | Higashino |
| 6,643,247 | B2 | | 11/2003 | Higashino |
| 7,072,269 | B2 | | 7/2006 | Higashino |
| 7,161,739 | B2 | | 1/2007 | Ikeda et al. |
| 7,646,550 | B2 | * | 1/2010 | Rohaly et al. ................ 359/740 |
| 2006/0093263 | A1 | | 5/2006 | Akashi et al. |

FOREIGN PATENT DOCUMENTS

| JP | 1-108522 | 4/1989 |
| JP | 7-284976 | 10/1995 |
| JP | 2001-84625 | 3/2001 |
| JP | 2003-43347 | 2/2003 |
| JP | 2006-126566 | 5/2006 |

* cited by examiner

*Primary Examiner* — Darryl J Collins
(74) *Attorney, Agent, or Firm* — Staas & Halsey LLP

(57) ABSTRACT

An optical apparatus includes a collimation optical member for collimating and outputting input light, a condensing optical member for condensing light from the collimation optical member and a light blocking mask member provided at a place on an optical path of the input light for light blocking part of the input light, and enhances the degree of freedom in design of an optical system.

14 Claims, 30 Drawing Sheets

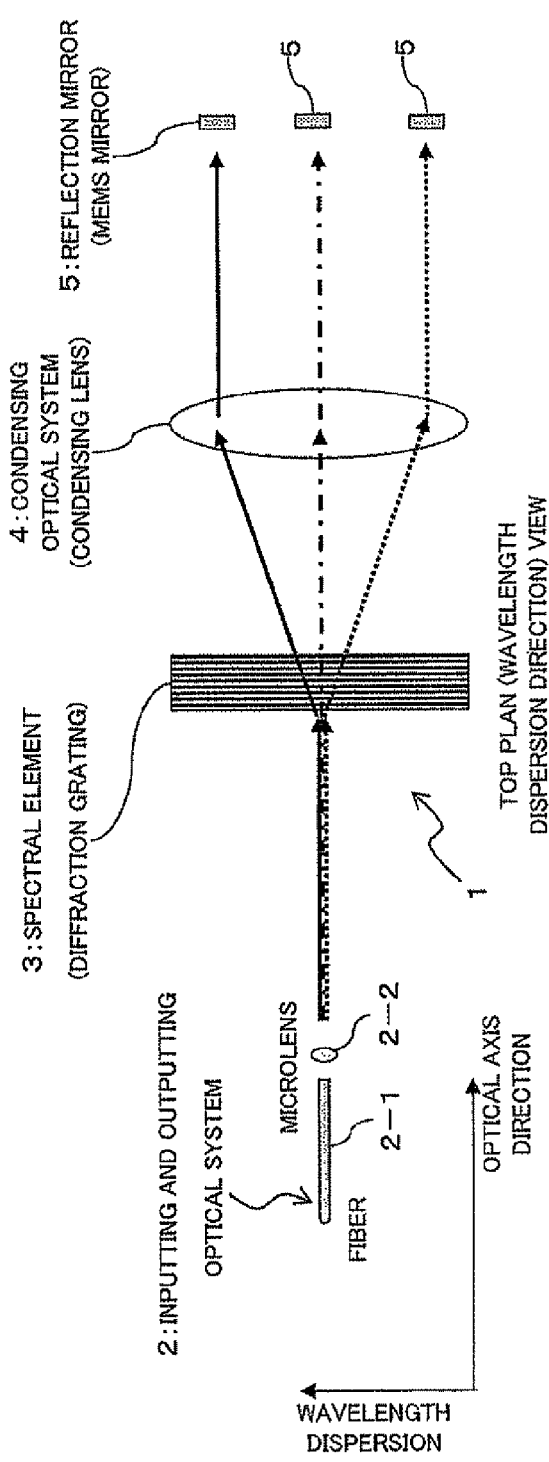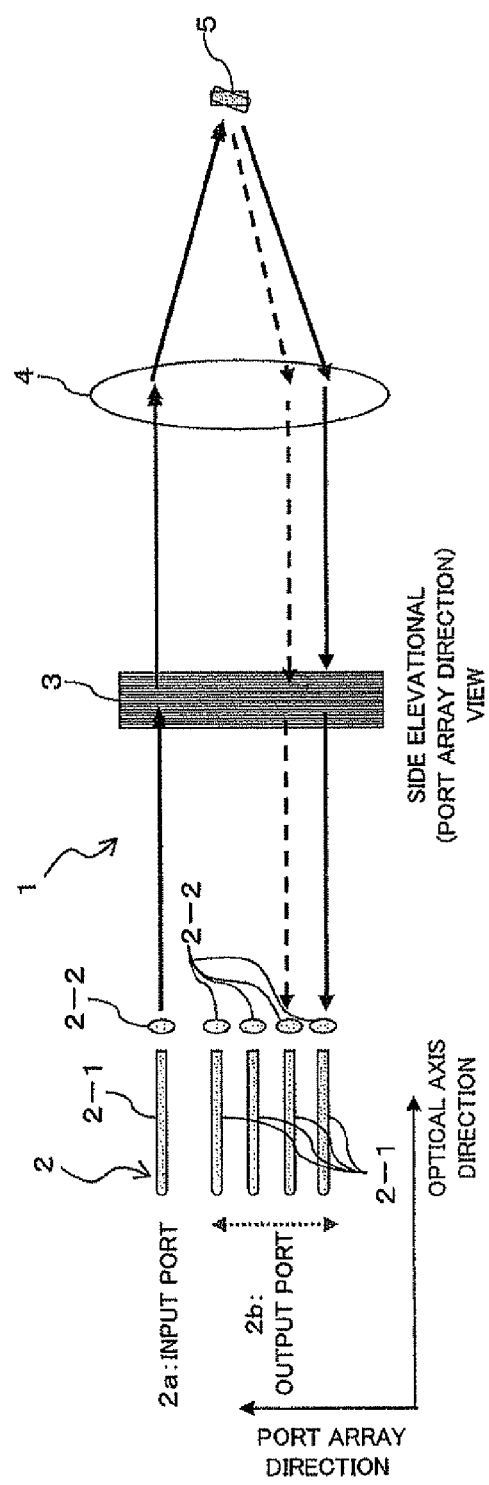
FIG. 1(a)
FIG. 1(b)

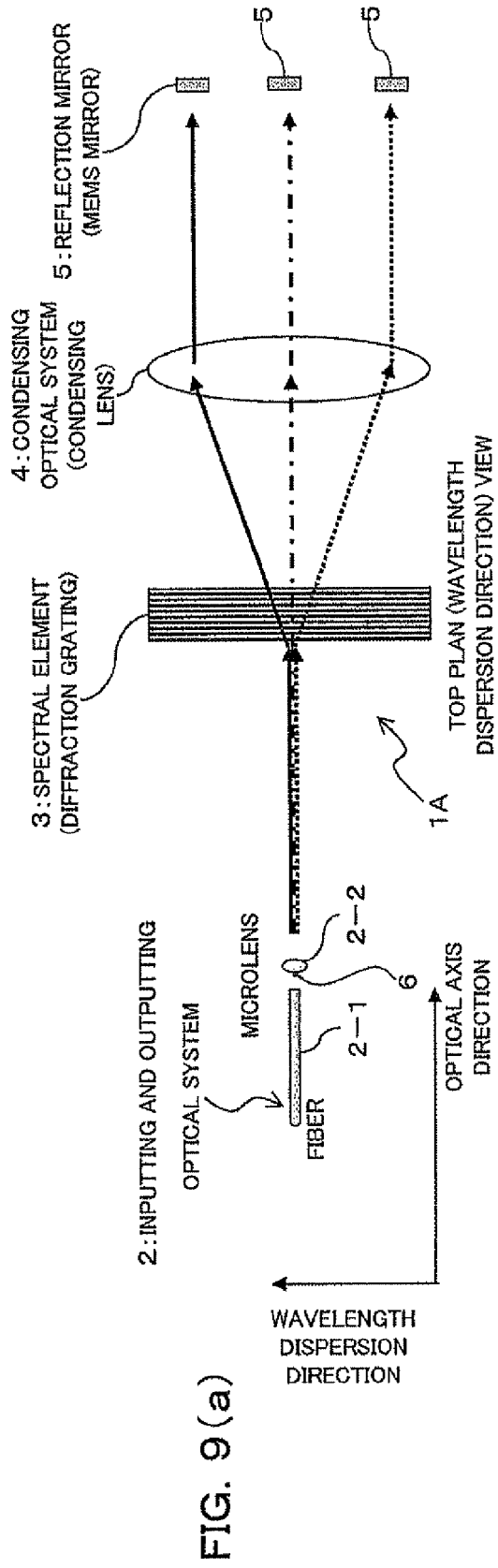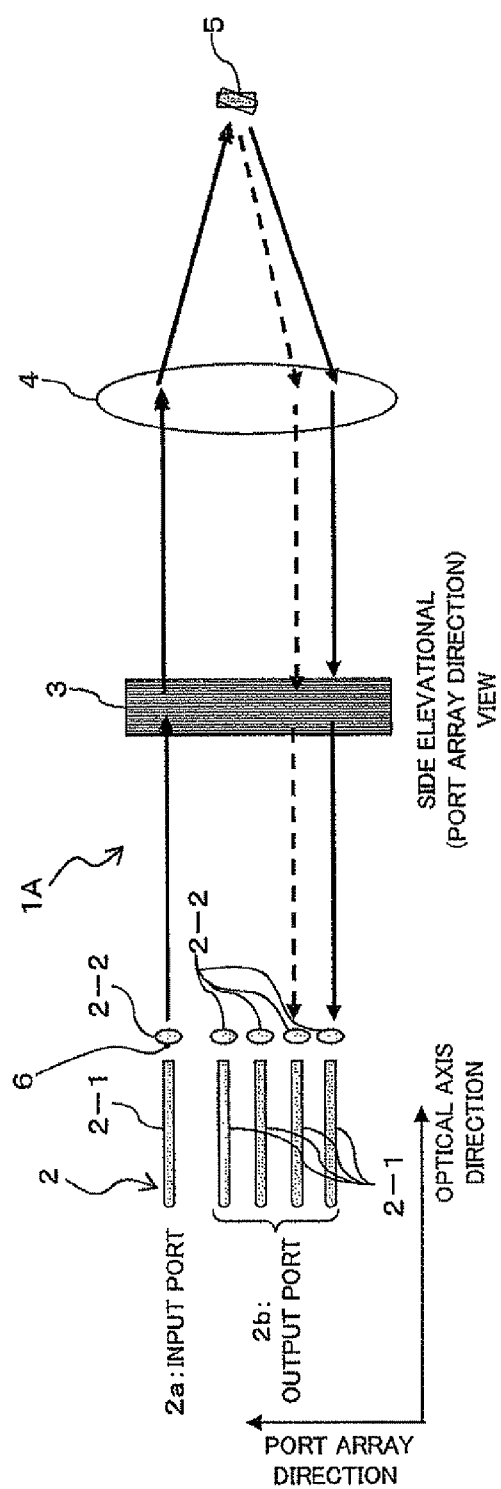

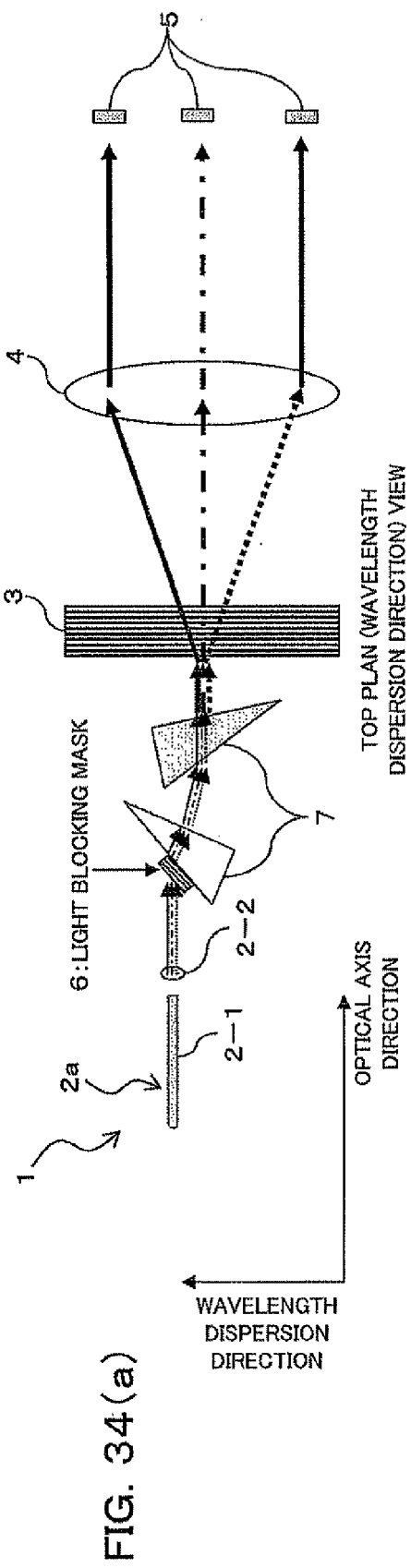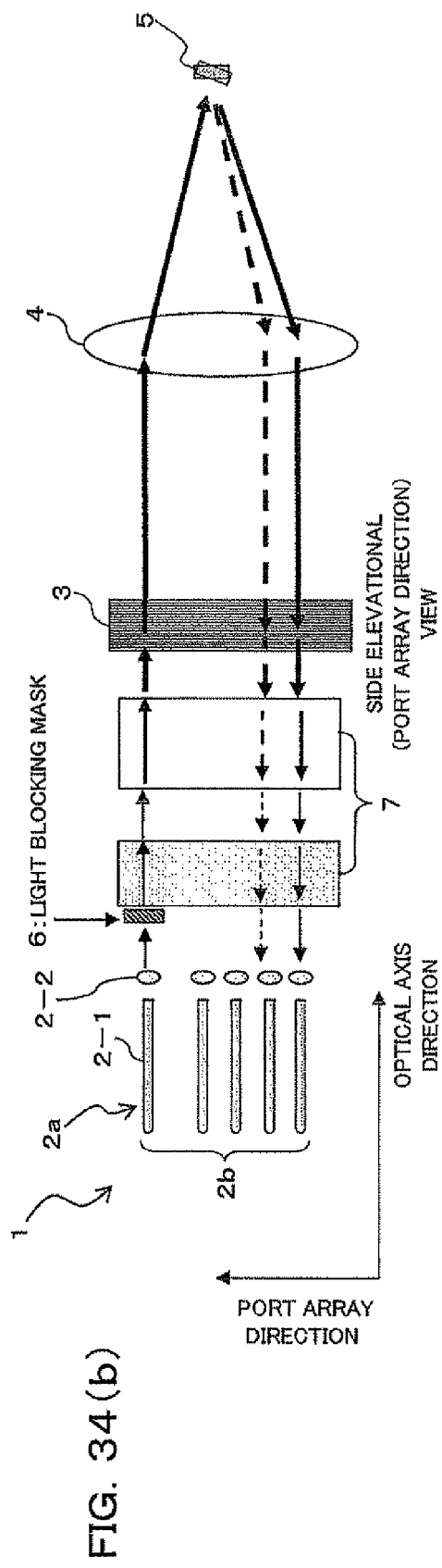
FIG. 34(a)
FIG. 34(b)

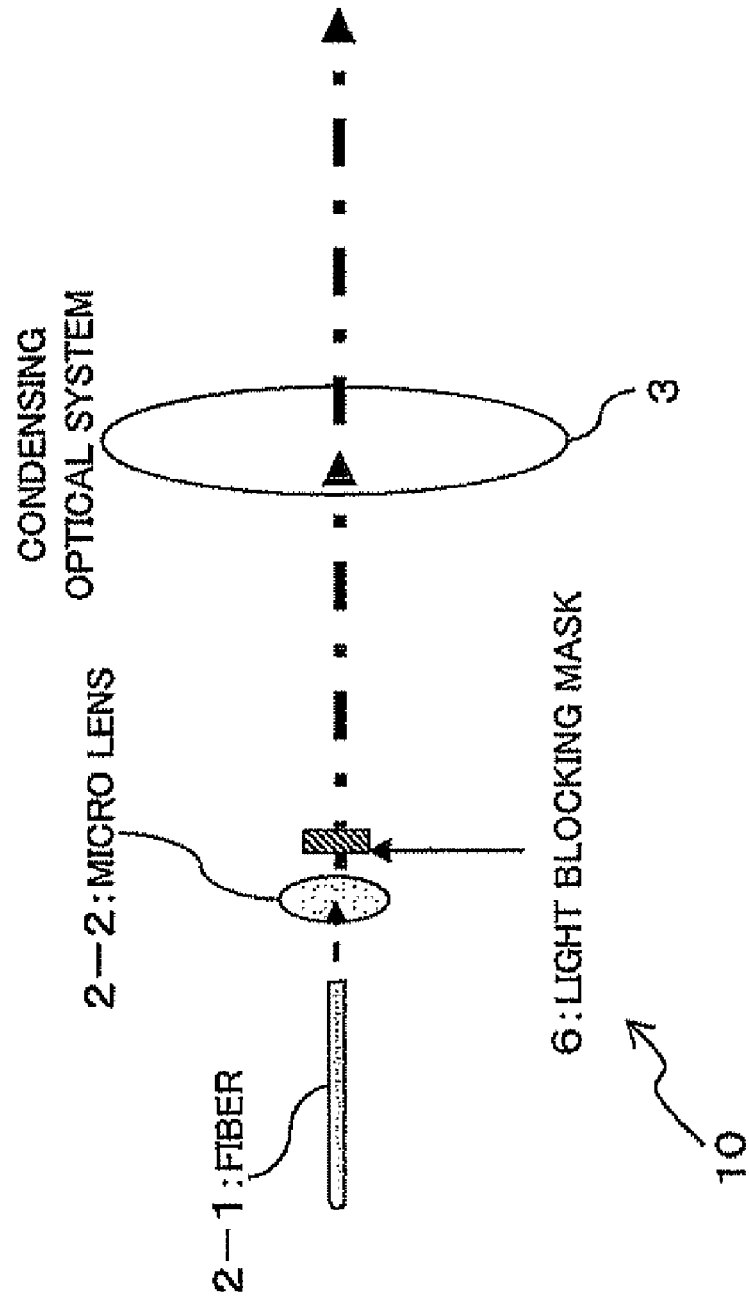

OPTICAL APPARATUS AND OPTICAL TRANSMISSION APPARATUS

CROSS-REFERENCE TO RELATED APPLICATION(S)

This application is based upon and claims the benefit of priority of the prior Japanese Patent Application No. 2008-134432, filed on May 22, 2008, the entire contents of which are incorporated herein by reference.

FIELD

The embodiment(s) discussed herein relates to an optical communication system.

BACKGROUND

At present, it is publicly known that, in order to accommodate remarkably increasing Internet traffic, the introduction of optical fibers into a network which uses wavelength division multiplexing (WDM) communication as a core technique advances at a quick pace. While the WDM at the present time principally assumes the form of a point-to-point network, it is anticipated that the WDM is progressed to a ring type network or a mesh-type network in the near future.

Further, it is anticipated that, in optical transmission apparatus (nodes) which compose the network, it becomes possible to use processes such as adding/dropping (Add/Drop) of an arbitrary wavelength, all-optical cross connect (Optical Cross Connect: OXC) which does not involve conversion into the electricity and dynamic setting and cancellation of a pass based on wavelength information are performed.

A wavelength selection switch is provided in an optical transmission apparatus in a ring type network or a mesh type network and is an optical apparatus having a function of distributing inputted light to an arbitrary output port for each wavelength. The wavelength selection switch is expected as a promising optical apparatus for making it possible to implement such processes of adding/dropping of an arbitrary wavelength and all-optical cross connect without conversion into the electricity as described above and so forth.

As such an optical apparatus which forms a wavelength selection switch as described above, an optical apparatus is available which includes not only a spectral element, a condensing optical system and so forth but also a MEMS (Micro Electro Mechanical System) mirror array for changing over the path. For such an optical apparatus which forms a wavelengths election switch as just described, various techniques for enhancing the degree of freedom in design and improving a characteristic of light to be outputted while coping with standardization by the International Communication Association or the like are developed.

Further, a technique is preferable for enhancing, in an optical system which includes a collimate optical system for collimating a light beam and a condensing optical system coupled to the collimate optical system, the degree of freedom in design and improving a characteristic which an optical system has.

(Patent Document 1) Japanese Patent Laid-Open No. 2006-126566
(Patent Document 2) Japanese Patent Laid-Open No. 2001-84625
(Patent Document 3) Japanese Patent Laid-Open No. Hei 1-108522
(Patent Document 4) Japanese Patent Laid-Open No. Hei 7-284976

SUMMARY (1) According to an aspect of the invention, an optical apparatus can be uses which includes a collimation optical member adapted to collimate and output incident light, a condensing optical member adapted to condense the light from the collimation optical member, and a light blocking mask member provided at a point on an optical path of the incident light and adapted to block part of the incident light.

(2) An optical transmission apparatus can be used in which the optical apparatus described in the paragraph (1) above is incorporated can be used.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 1(a) is a top plan view of a wavelength selection switch, and FIG. 1(b) is a side elevational view of the wavelength selection switch;

FIG. 9(a) is a top plan view depicting a wavelength selection switch as an optical apparatus in a first embodiment, and FIG. 9(b) is a side elevational view depicting the wavelength selection switch;

FIG. 34(a) is a top plan view of a wavelength selection switch according to a modification to the second embodiment, and FIG. 34(b) is a side elevational view of the wavelength selection switch according to the modification to the second embodiment;

FIG. 35 is a view depicting an optical apparatus according to a third embodiment of the present invention.

DESCRIPTION OF THE PREFERRED EMBODIMENTS

In the following, embodiments are described with reference to the drawings. However, the embodiments described below are examples to the end and there is no intention to exclude application of various modifications or techniques which are not described below. In other words, the embodiments can be carried out such that variations and modifications (combinations of various embodiments or the like) can be made without departing from the scope of the present invention.

[A] First Embodiment

Figure 36B:
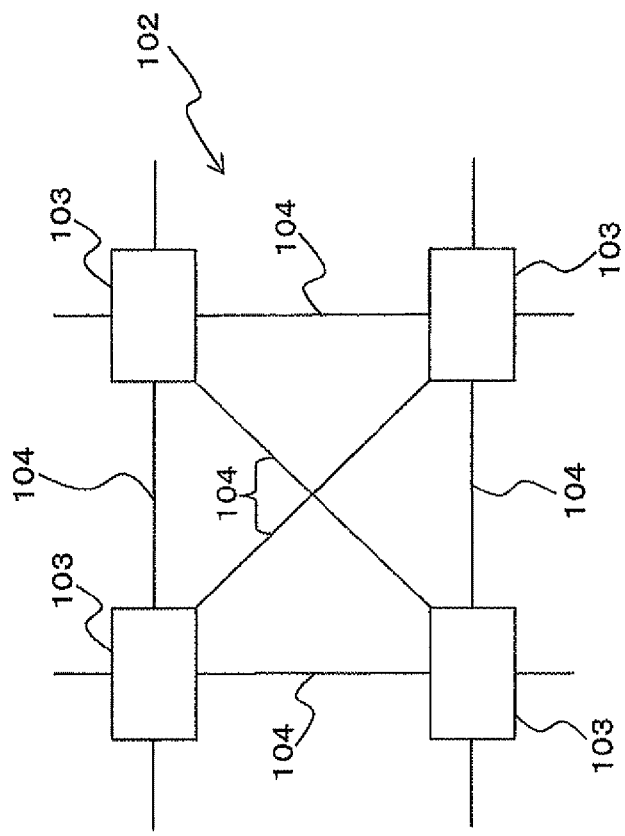
FIG. 36(b) is a view depicting a mesh type network.
Figure 36A:
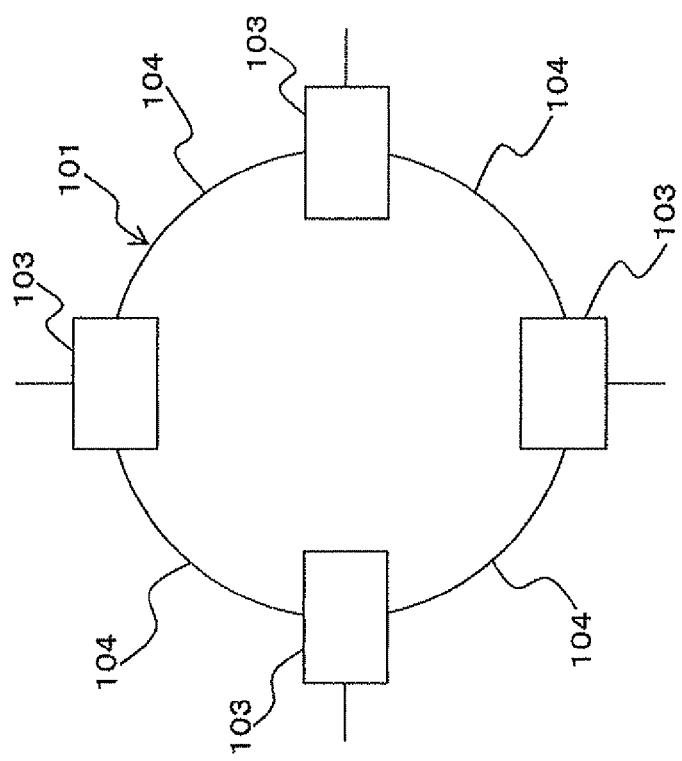
FIG. 36(a) is a view depicting a ring type network.

A wavelength selection switch is an optical switch which is provided in a node (optical transmission apparatus) 103 in such a ring type network 101 as depicted in FIG. 36(a), such a mesh type network 102 as depicted in FIG. 36(b) or the like. Here, the ring type network 101 is formed by interconnecting such nodes 103 in a ring form through an optical transmission path 104. Meanwhile, the mesh type network 102 is formed by interconnecting such nodes 103 in a mesh form through the optical transmission path 104.

The wavelength selection switch is applied to an optical transmission apparatus as the node 103 described above to implement such processes as adding/dropping of an arbitrary wavelength, all-optical cross connect without conversion into the electricity or the like. A concept of the wavelength selection switch is illustrated in FIGS. 1(a) and 1(b). FIG. 1(a) is a top plan view of the wavelength selection switch 1 and FIG. 1(b) is a side elevational view of the wavelength selection switch 1. The wavelength selection switch 1 includes an inputting and outputting optical system 2 having an input port 2a and an output port 2b, a spectral element 3, a condensing optical system 4 and reflection mirrors 5 which are arrayed in a spectroscopic direction of the spectral element 3 for angular variation.

As depicted in FIGS. 1(a) and 1(b), the input port 2a and the output port 2b are arrayed, for example, along a substantially vertical direction with respect to the spectroscopic direction of the spectral element 3. In FIGS. 1(a) and 1(b), as an example, one input port 2a and a plurality of output ports 2b (four output ports in FIG. 1(b)) are arrayed along the direction just described.

Each of the input port 2a and the output ports 2b which form the inputting and outputting optical system 2 include an optical fiber 2-1 and a microlens 2-2. Input light (introduced light) to the wavelength selection switch 1 is introduced through the optical fiber 2-1 which forms the input port 2a and is collimated by the microlens 2-2 and then introduced to the spectral element 3.

In particular, the microlens 2-2 which forms the input port 2a is an input end side collimation optical member provided at least corresponding to the light input end, which outputs input light, for collimating the input light from the optical fiber 2-1. Further, each of the microlenses 2-2 which form the output ports 2b is an output end side collimation optical member for introducing reflection light reflected by the corresponding reflection mirror 5 hereinafter described to the optical fiber 2-1 which forms the light output end.

In particular, in each of the microlenses 2-2 which form the output ports 2b, light subjected to path changeover is introduced as output light from the wavelength selection switch 1 to the corresponding optical fiber 2-1. It is to be noted that, in the present embodiment, the microlenses 2-2 whose light input and output faces have a spherical shape are applied as the input end side and output end side collimation optical members.

A diffraction grating is generally used as the spectral element 3, and the spectral element 3 spectralizes the light from the microlens 2-2 which forms the input port 2a and introduces (outputs) the resulting light to the condensing optical system 4. On the other hand, the spectral element 3 bundles wavelengths of light beams having a similar port array direction level from within light reflected by the reflection mirrors 5 at the following stage and condensed by the condensing optical system 4 so as to be individually coupled to the same output ports 2b.

The diffraction grating used as the spectral element 3 is an optical element configured by periodically forming a great number of grooves arranged in parallel to each other on a glass substrate and utilizes the diffraction phenomenon of light to provide output angles different among different wavelengths to a plurality of wavelength components which are inputted with a fixed angle.

The condensing optical system 4 condenses light spectralized by the spectral element 3 to the reflection mirrors 5 arrayed in a corresponding relationship to the individual wavelengths. For example, a condensing lens of a transmission type or a reflection type is used for the condensing optical system 4. In other words, the condensing optical system 4 is a condensing optical member for condensing light from the microlens 22 which forms the input port 2a.

For example, a plurality of mirrors individually having a variable reflection angle are used as the reflection mirrors 5 and are arrayed in a corresponding relationship to the spectroscopic directions by the spectral element 3. In particular, one mirror is disposed for each wavelength separated by the spectral element 3. The plural reflection mirrors 5 arrayed in such a manner as just described can be integrally formed as a MEMS mirror array. Each individual reflection mirror 5 is hereinafter referred to sometimes as MEMS mirror.

In the wavelength selection switch 1 configured in such a manner as described above, the light beams having the wavelengths spectralized by the spectral element 3 are reflected by the reflection mirrors 5 individually having reflection angles which can be varied independently of each other. At this time, depending upon the setting of the reflection angle of each reflection mirror 5, an arbitrary output port 2b from among the plural output ports 2b can be set as the output port 2b to which the reflection light is introduced through the condensing optical system 4 and the spectral element 3.

In other words, the reflection mirrors 5 are a plurality of mirrors which reflect light condensed by the condensing optical system 4 in response to the wavelength of the light and have reflection angles which can be set variably. Further, each of the microlenses 2-2 of the output ports 2b which are output end side collimation optical members is provided with respect to an optical axis of the reflection light defined in accordance with the reflection angle of the corresponding reflection mirror 5. In other words, the reflection light reflected by the reflection mirror 5 can be coupled to the corresponding output port 2b depending upon setting of the angle of the reflection face.

It is to be noted that also it is possible to exchange the functions of the input port 2a and the output ports 2b for each other. In other words, it is also possible for the microlenses 2-2 to have both of the functions as the input end side collimation optical member and the output end side collimation optical member.

Figure 2:
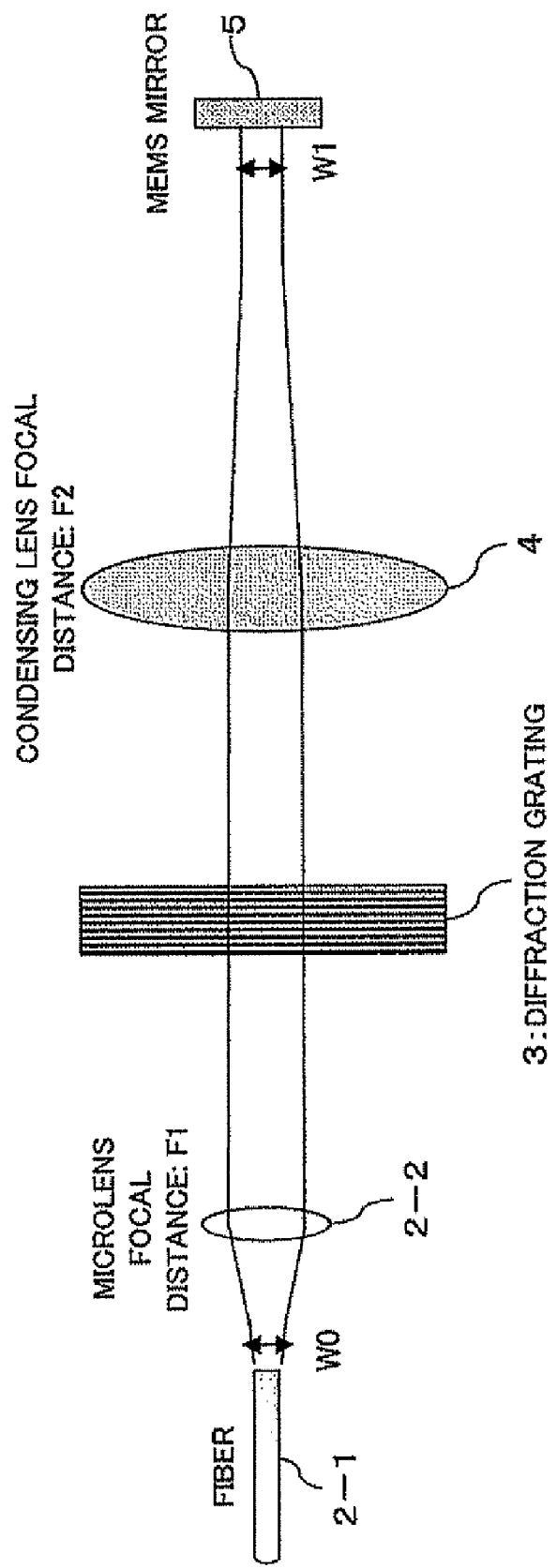
FIGS. 2 to 8 are views illustrating a subject to be solved by the present invention.
Figure 3:
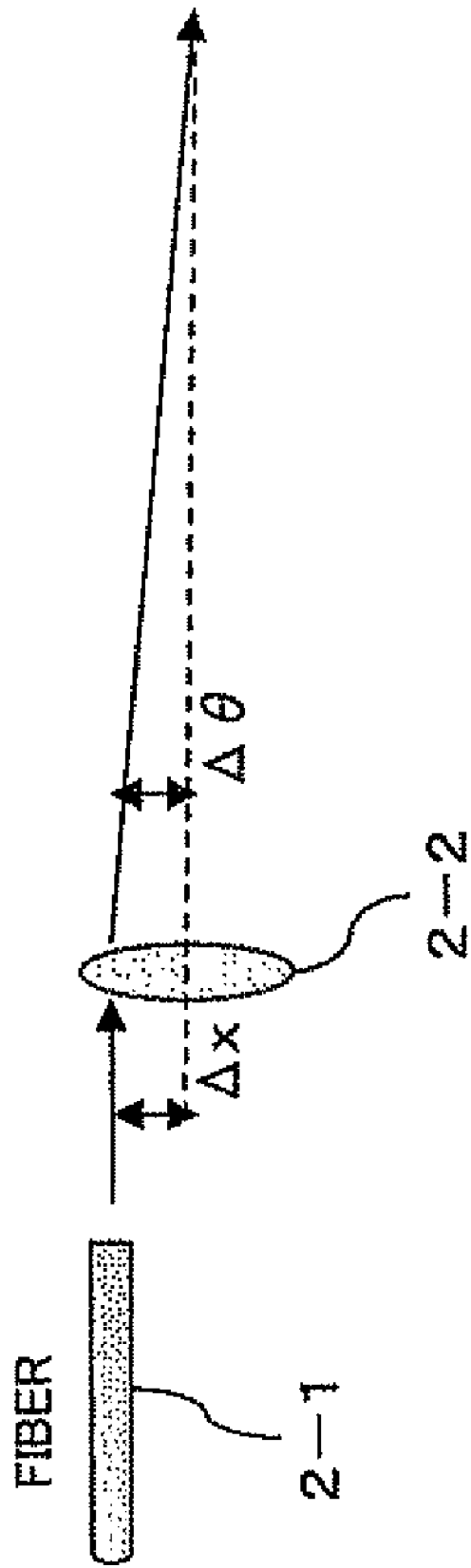
Figure 4:
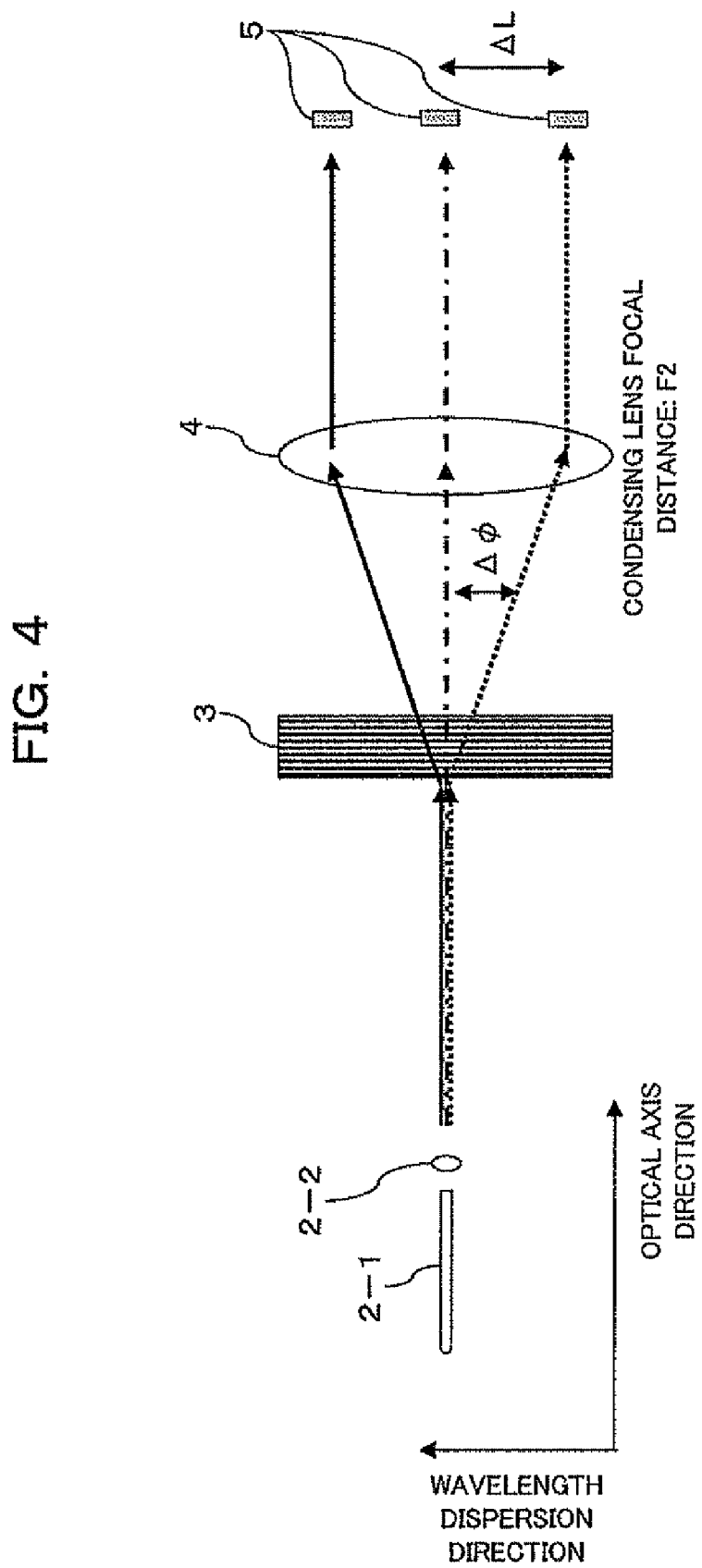

Incidentally, in the wavelength selection switch 1, the beam size W1 on the reflection mirror 5 is a significant parameter having an influence on the transmission spectrum band width, crosstalk and flatness of the transmission band spectrum and is geometrically optically determined in accordance with the following expression (1):

$$W1 = W0 \times F2/F1 \quad (1)$$

where, as depicted in FIG. 2, W0 represents the beam diameter just after outputted from the optical fiber 2-1, F1 the focal distance of the microlens 2-2, F2 the focal distance of the condensing lens which forms the condensing optical system 4, and F2/F1 the geometrical optical magnification. At this time, it can be recognized that, since W0 is generally fixed, where it is intended to vary the beam size W1 on the MEMS mirror 5, the focal distance F1 or F2 may be varied.

However, for example, if F1 is made long, then the size of the microlens 2-2 increases. Therefore, the module size in a port direction may increase or it may become necessary to reduce the number of ports which can be arrayed. Further, where the position displacement between the center of the optical fiber 2-1 and the center of the microlens is represented by $\Delta x$ and the beam angle displacement after outputted from the microlens by $\Delta\theta$, they have a relationship given by the following expression (2):

$$\Delta x = F1 \times \text{TAN}(\Delta\theta) \quad (2)$$

If it is tried to make F1 short, then the following subject is provided from the expression (2). In particular, where there is such a restriction to the design that it is necessary to set $\Delta\theta$ to a certain value or less in order to suppress the loss of light, beam position displacement on the MEMS mirror 5 or the like, the required accuracy for $\Delta x$ becomes severe, and difficulty in a fabrication process may be confronted.

On the other hand, if F2 is made long, then since the length of the optical path increases, the module size increases. Further, where the difference of the diffraction angle after transmission through the diffraction grating caused by a difference of the wavelength per one channel is represented by $\Delta\phi$, the distance $\Delta L$ between the MEMS mirrors 5 per one channel is represented by the following expression (3):

$$\Delta L = F2 \times \text{TAN}(\Delta\phi) \quad (3)$$

If it is tried to make F2 short, then the following subject is provided from the expression (3). In particular, if F2 is made short, then $\Delta L$ decreases, resulting in the possibility that difficulty in a fabrication process for the reflection mirror 5 may be confronted.

In this manner, there is a restriction if it is tried to make any of F1 and F2 long or short, and in most cases, the values of F1 and F2 are determined as specified values upon apparatus designing from a tradeoff relationship of them. In this instance, if it is tried to vary the beam diameter W1 on the MEMS mirror 5, since there is no degree of freedom in F2/F1, some trouble may appear on application of suitable adjustment with regard to W1.

Figure 5:
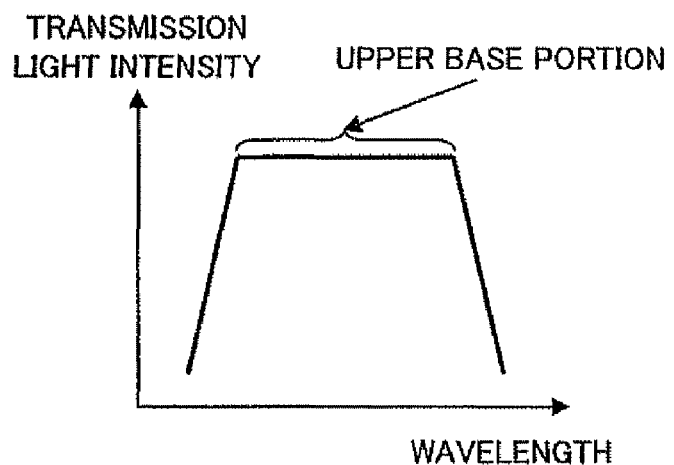

Description is given of an influence on an actual characteristic taking notice of, for example, flatness of a transmission band spectrum of light outputted through an optical fiber 2-1 which forms the output port 2b. As depicted in FIG. 5, the transmission band spectrum is a trapezoidal spectrum wherein the wavelength (frequency) and the transmission light intensity of the output light are indicated by the abscissa axis and the ordinate axis, respectively, and ideally, flatness (characteristic of a wavelength region indicated by an upper base portion of the trapezoid) in used wavelengths is demanded from an influence on a transmission characteristic upon system use.

Figure 6:
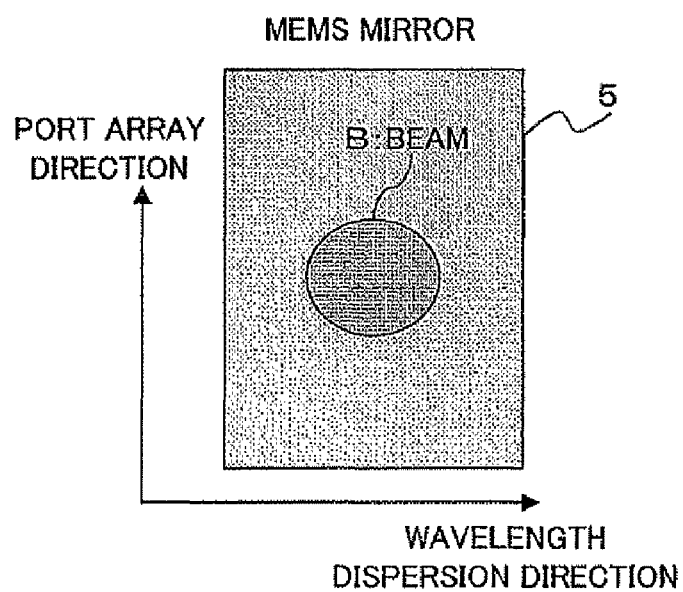
Figure 7:
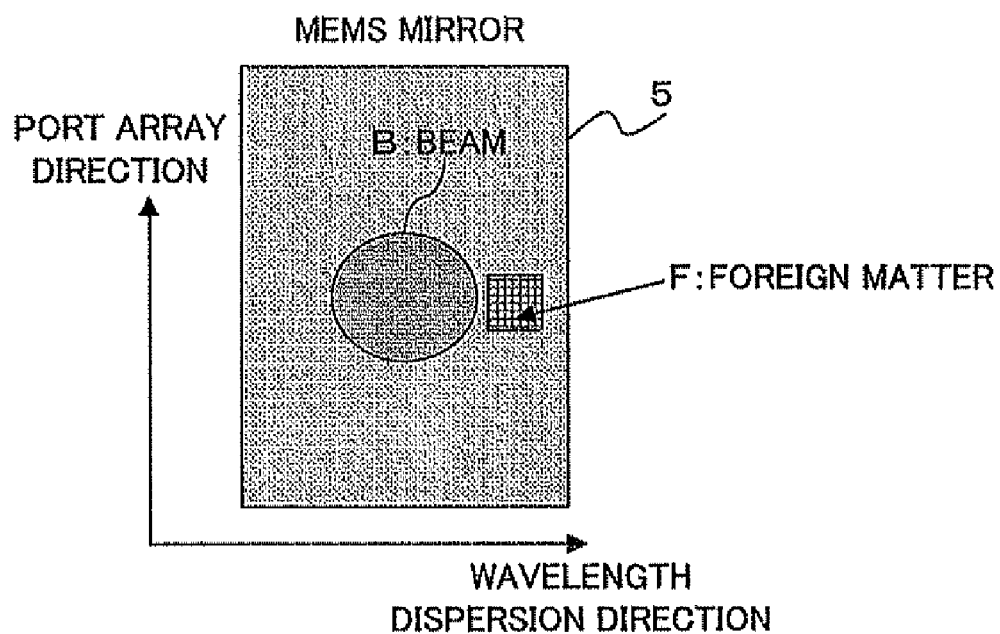
Figure 8:
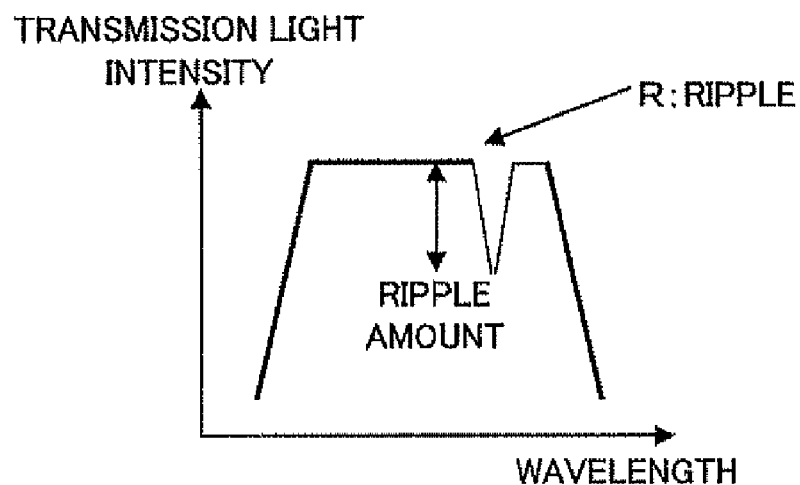

As depicted in FIG. 6, the transmission band spectrum indicates such an ideal flatness characteristic as depicted in FIG. 5 in an ideal state wherein there is no foreign matter on the reflection mirrors 5. On the other hand, if there exists a foreign matter or a reflection coat miss F on the MEMS mirror 5 as depicted in FIG. 7, then a concave- or convex-shaped ripple R appears on the transmission band spectrum as depicted in FIG. 8. This is because, since, different from the case of FIG. 6, diffraction of a beam B on the reflection mirror 5 is caused by the foreign matter or the reflection coat miss, the coupling state of the output port 2b to which the light having the wavelength is introduced varies.

Although, upon system use, the difference (ripple amount) from the flat portion to the peak position of the ripple is defined, it is difficult to completely remove a foreign matter and a reflection coat miss upon fabrication of the MEMS mirror 5. Where the sizes of a foreign matter and a reflection coat miss on the MEMS mirror 5 are same as each other, since, if the size W1 of the beam B on the MEMS mirror 5 is great, then the beam power on which an influence of diffraction is had is relatively low, also the ripple amount decreases.

Therefore, while it is desirable from a point of view of reduction of the ripple that the beam size W1 on the MEMS mirror 5 is great, it is difficult to increase the beam size W1 on the MEMS mirror 5 from the limitation of F2/F1 described above and there is difficulty in that the ripple amount is effectively decreased.

Therefore, in the present embodiment, such a technique as described below is proposed wherein the beam size on the MEMS mirror 5 is varied without the limitation of the geometrical optical lateral magnification F2/F1. In particular, the wavelength selection switch 1 in the present embodiment includes a light blocking mask member provided at a place on the optical path of light (input light) inputted from the optical fiber 2-1 which forms the input port 2a for blocking part of the input light.

Figure 10:
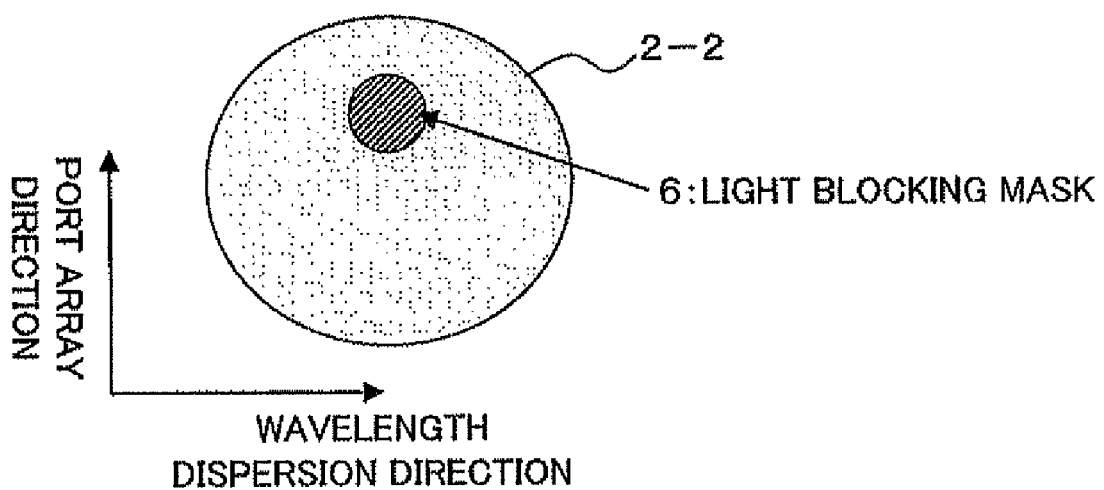
FIG. 10 is a view depicting a microlens on which a light blocking mask is mounted.

In the first embodiment, as depicted in FIGS. 9(*a*) and 9(*b*), the light blocking mask 6 is provided on the microlens 2-2 of the input port 2a in the wavelength selection switch 1 as the optical apparatus described above and depicted in FIG. 1. In particular, as depicted in FIG. 10, the light blocking mask (light blocking mask member) 6 having no aperture is provided locally on the lens spherical face which configures the output face (face on the spectral element 3 side) of the microlens 2-2. It is to be noted that FIG. 9(a) is a top plan view depicting the wavelength selection switch 1A as the optical apparatus in the first embodiment and FIG. 9(b) is a side elevational view depicting the wavelength selection switch 1A.

Figure 11:
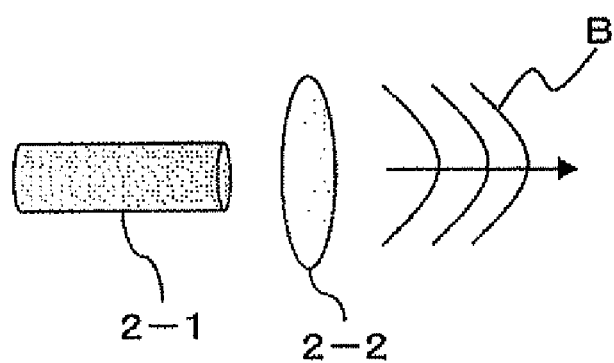
FIG. 11 is a view illustrating distortion of a beam wavefront by the light blocking mask.

By providing the light blocking mask 6 on the spherical face of the microlens 2-2, a beam wavefront B after outputted from the microlens 2-2 is distorted as depicted in FIG. 11 such that, from an influence of the diffraction, the beam diameter on the MEMS mirror 5 varies in comparison with that where the light blocking mask is not provided. Generally, the light blocking mask 6 must be provided within a range twice the gauss beam diameter of light in order to have an influence of varying the beam diameter on the diffraction. In other words, the light blocking mask 6 may be provided within a range twice the gauss beam diameter on the spherical face of the microlens 2-2.

Now, an example of the position and the shape of the light blocking mask 6 on the spherical face of the microlens 2-2 is described based on the beam shape on the MEMS mirror 5. The beam shape on the MEMS mirror 5 based on the shape and position of the light blocking mask 6 can be determined as described below.

For example, the beam shape on the MEMS mirror 5 can be determined by solving the Fresnel-Kirchhoff's diffraction formula determining the aperture region on the microlens 2-2 by the light blocking mask 6 as an integration region to derive an intensity distribution of the beam on the MEMS mirror 5. However, the case wherein integration in accordance with the Fresnel-Kirchhoff's diffraction formula can be performed is limited, or even if such integration is possible, the calculation is very difficult. Therefore, also it is possible to use a computer simulation such as a beam propagation analysis method.

Figure 12:
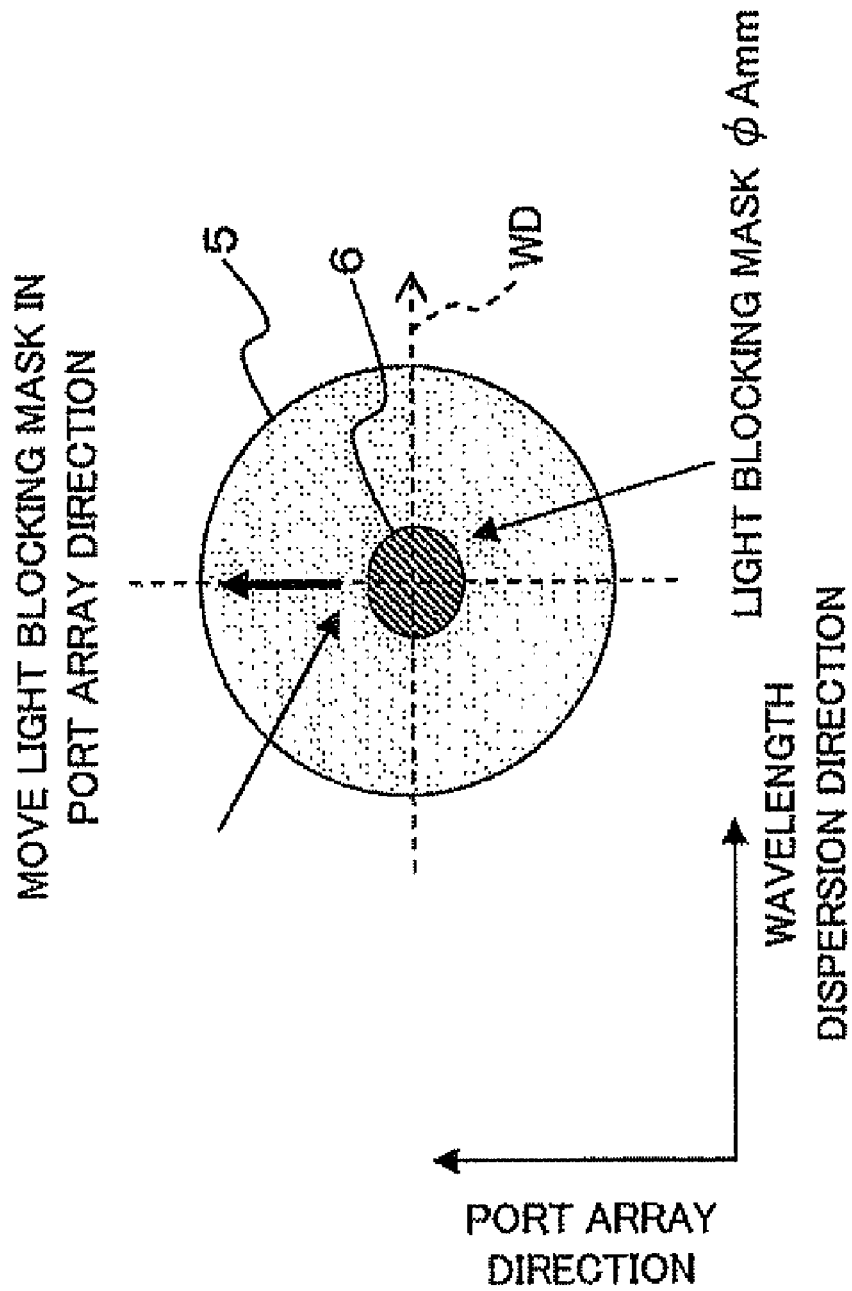
FIGS. 12 to 15 are views illustrating a beam size on a MEMS mirror where the position of the light blocking mask on the microlens is moved.
Figure 13:
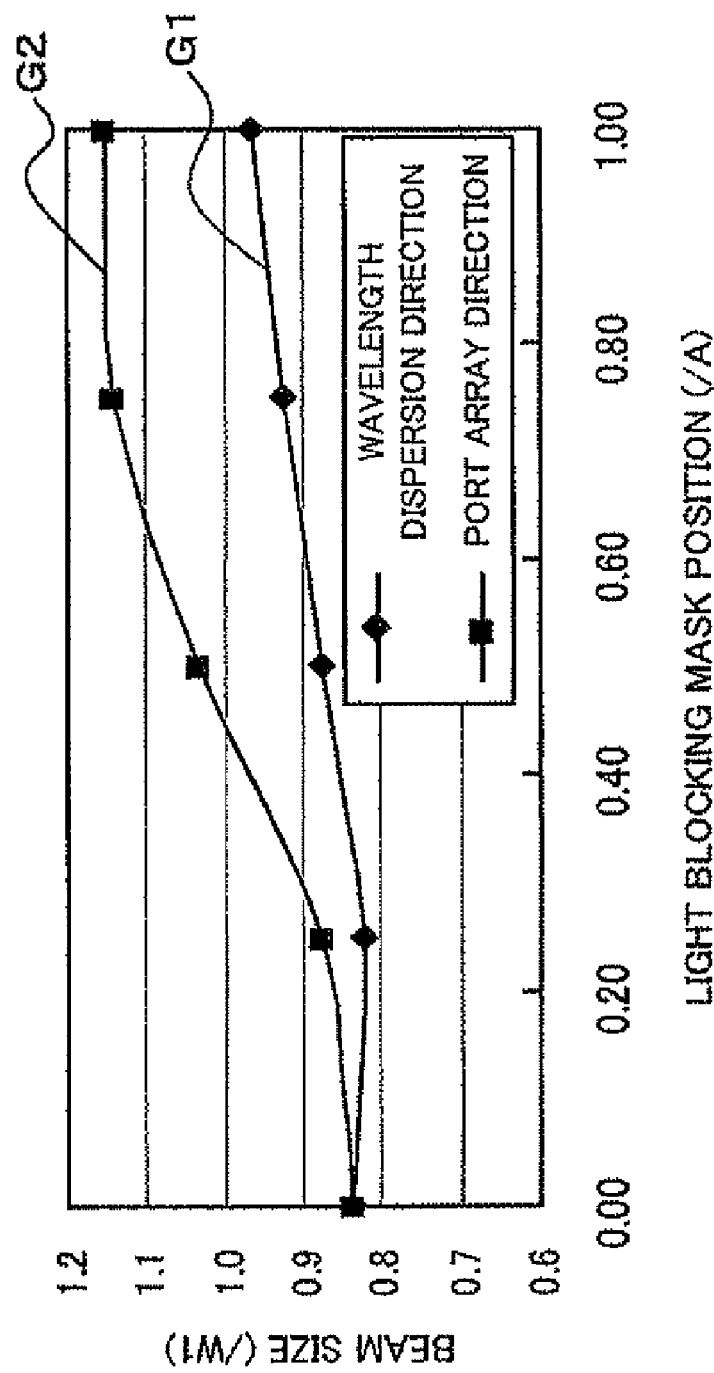

As an example, where the light blocking mask 6 was formed as a circular light blocking mask having a diameter A mm and the position of the light blocking mask 6 on the microlens was moved in a port direction on the center line WD in a wavelength dispersion direction as depicted in FIG. 12, the beam size on the MEMS mirror 5 was calculated by the beam propagation analysis method described above. A result of the calculation is illustrated in FIG. 13. It is to be noted that the wavelength dispersion direction is a direction wherein light having various wavelength components is dispersed by spectralization by the spectral element 3 as seen in FIG. 1.

Referring to FIG. 13, the abscissa axis of the graph indicates the movement amount of the light blocking mask 6 from the center position (in the wavelength dispersion direction) of the microlens 2-3 as a ratio to the light blocking mask diameter A. The ordinate axis of the graph indicates the beam size in the wavelength dispersion direction (G1) and the port array direction (G2) as a ratio to the beam diameter W1 on the MEMS mirror 5 where the light blocking mask is not provided.

As seen in FIG. 13, in comparison with the case wherein the light blocking mask 6 is not formed, the beam diameter on the MEMS mirror 5 can be varied by forming the light blocking mask 6 to suitably move the place at which the mask 6 is formed in the wavelength dispersion direction.

Figure 14:
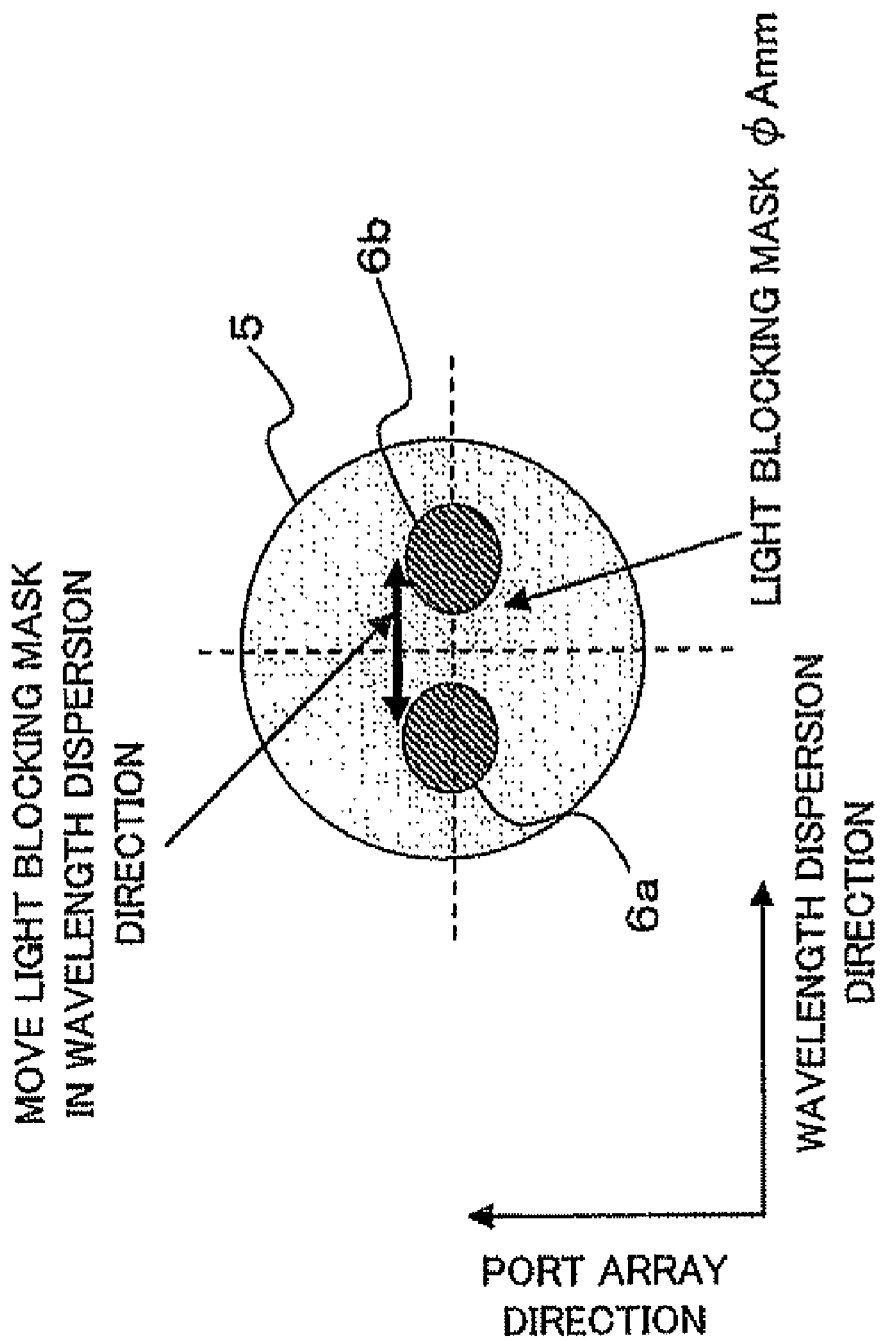
Figure 15:
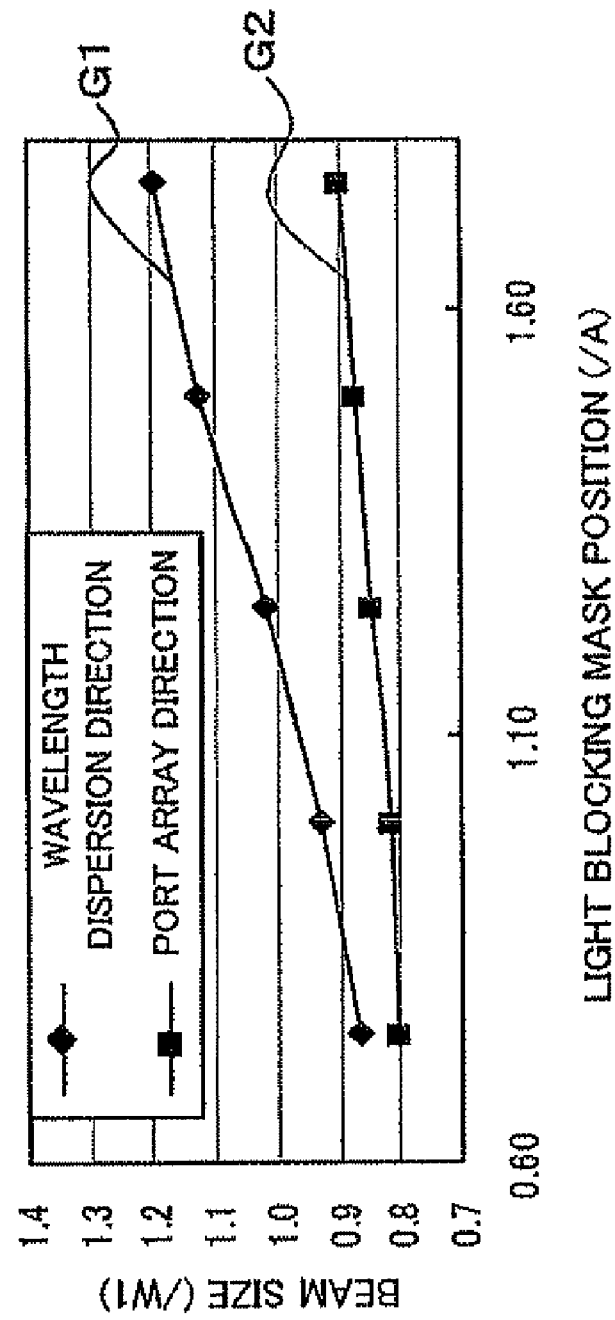

As another example, where two circular light blocking masks 6a and 6b individually having a diameter A mm were moved line symmetrically in the wavelength dispersion direction on the center line in the port array direction as seen in FIG. 14, the beam size on the MEMS mirror 5 was calculated by the beam propagation analysis method. A result of the calculation is illustrated in FIG. 15. At this time, the abscissa axis of the graph indicates the distance between the centers of the two light blocking masks 6a and 6b.

It is recognized from the two examples described above that, by forming the light blocking mask 6 (masks 6a and 6b) on the spherical face of the microlens 2-2, the beam size on the MEMS mirror 5 can be increased (within a range wherein the value of [beam size/W1] becomes higher than [1.0]) or decreased (within a range wherein the value of [beam size/W1] becomes lower than [1.0]).

Further, also it is recognized from the two examples of the calculation that the beam sizes in the port array direction and the wavelength dispersion direction vary separately from each other. In particular, by adjusting the size and position of the light blocking mask 6 (masks 6a and 6b), the beam size on the MEMS mirror 5 can be not only varied while maintaining the circular shape thereof but also varied to an arbitrary elliptical shape.

Particularly, in FIG. 14, the light blocking masks 6a and 6b are provided at positions line-symmetrical with respect to a substantial bisector in the spectroscopic direction (wavelength dispersion direction) of the spectral element 3 on a transmission plane (here, output face of the microlens 2-2) of light at a place on the optical path of the input light from the optical fiber 2-1.

By the provision described above, the beam sizes (beam size G1 in the wavelength dispersion direction and beam size G2 in the port array direction) on the MEMS mirror 5 can be increased in accordance with increase of the distance between the light blocking masks 6a and 6b as seen in FIG. 15. In particular, the distance between the light blocking masks 6a and 6b can be easily adjusted in response to the beam size on the MEMS mirror 5 to be targeted and facilitation of the design of the optical system can be promoted.

It is to be noted that the diameter A of the light blocking mask 6 (masks 6a and 6b) described above can be suitably set within a range wherein such variation of the beam size as described above gives rise to suitable values of characteristics of the light loss, ripples hereinafter described and so forth. Further, while the light blocking mask 6 on the spherical face of the microlens 2-2 is formed on the spectral element 3 side (light output side) in the case described above, the light blocking mask may otherwise be formed on the spherical face of the microlens 2-2 on the optical fiber 2-1 side (light input side).

Figure 16:
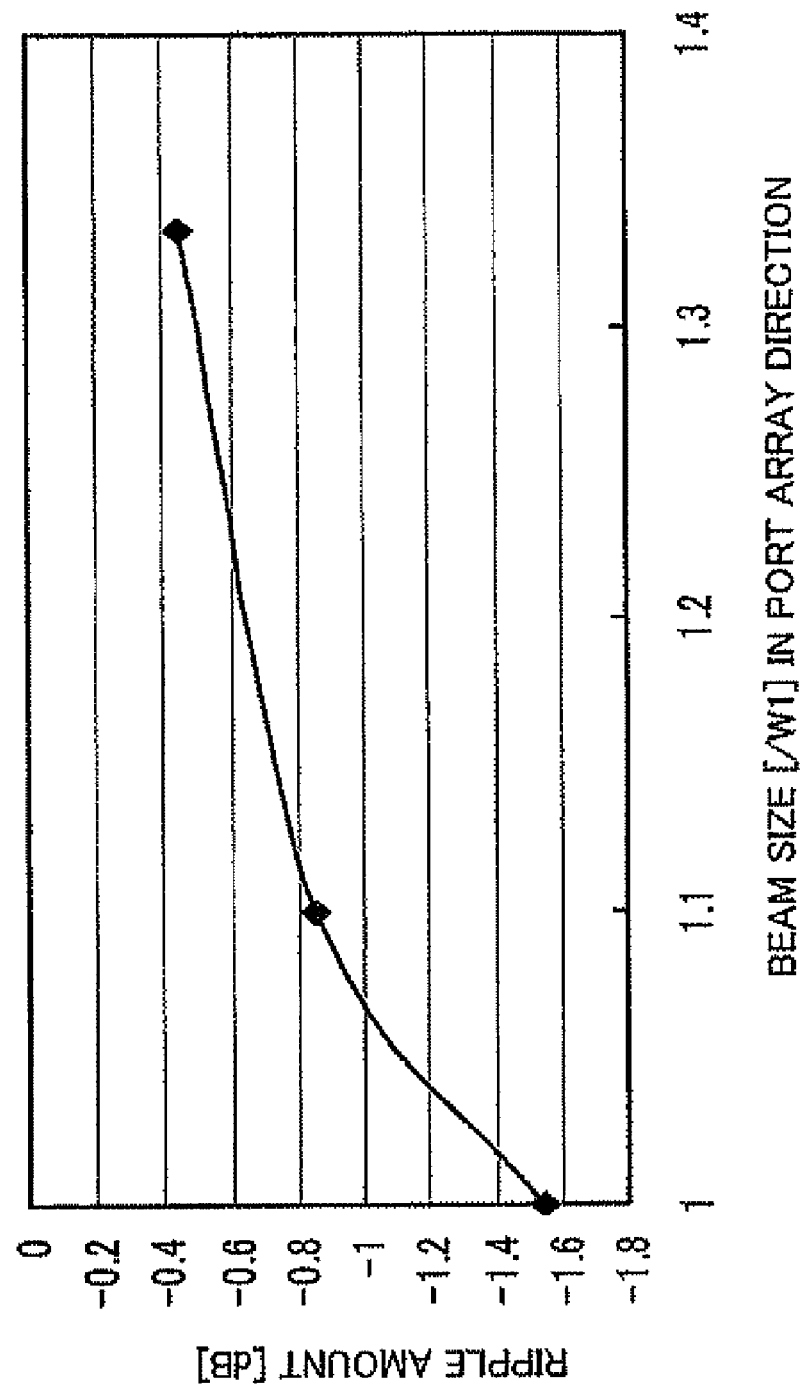
FIG. 16 is a view illustrating a reduction effect of the ripple amount by variation of the beam size on the MEMS mirror.

In the first embodiment, since the light blocking mask 6 is provided on the spherical face of the microlens 2-2 as described above, the beam size on the MEMS mirror 5 is varied. Consequently, the ripple appearing on the transmission band spectrum of output light can be reduced. FIG. 16 is a view illustrating a ripple reduction effect obtained by varying the beam size on the MEMS mirror 5 as an example.

Here, in FIG. 16, the abscissa axis and the ordinate axis represent the size (/W1) of the beam on the MEMS mirror 5 in the port array direction and the ripple amount (dB) when a foreign matter having a certain size exists, respectively. Since, where the light blocking mask 6 (masks 6a and 6b) is not provided, the beam size is W1, a ripple of approximately −1.6 dB appears.

On the other hand, since, where the position of the light blocking mask 6 is determined at a position of 0.8 on the abscissa axis, for example, as depicted in FIG. 13, the beam size in the port array direction can be determined to approximately 1.1 times W1, the ripple amount can be determined to approximately −0.8 dB as depicted in FIG. 16. In this instance, in comparison with the case wherein the light blocking mask 6 (masks 6a and 6b) described above is not provided, the ripple amount is reduced to approximately one half.

Figure 18:
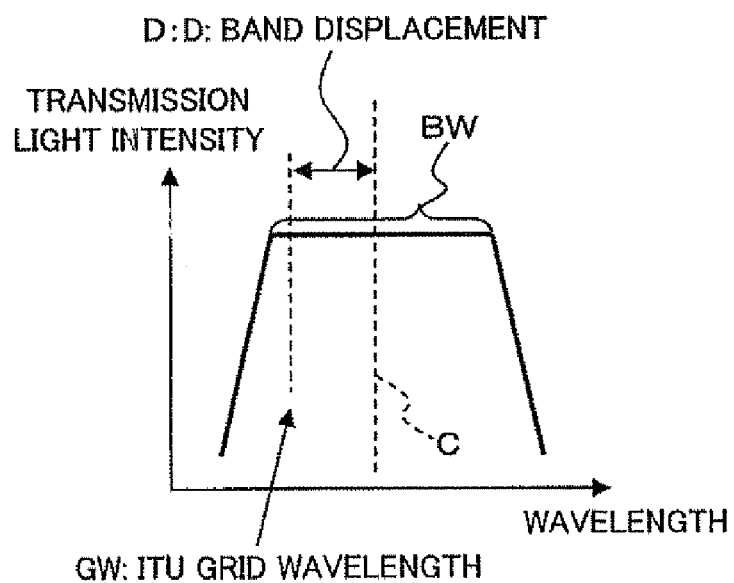
FIG. 18 is a view illustrating a band displacement of transmission light with respect to the ITU grid wavelength.

Incidentally, the transmission band characteristic is an important factor in the wavelength selection switch 1. As depicted in FIG. 18, the transmission band characteristic is determined by a transmission spectrum band width (refer to the upper base portion in FIG. 5) BW and a displacement amount (band displacement D) between the center C of the transmission spectrum in the wavelength direction and a wavelength GW of the corresponding International Telecommunication Union grid (ITU grid).

Figure 17:
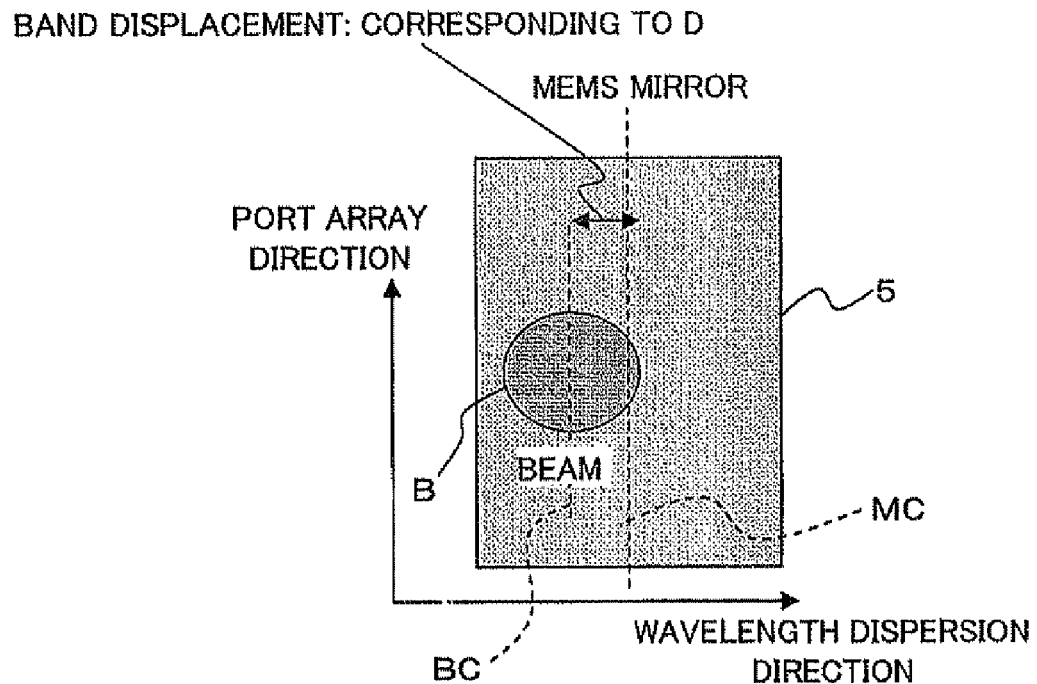
FIG. 17 is a view illustrating a displacement of a beam from the center in a wavelength dispersion direction by an ITU grid wavelength corresponding to the center line in the wavelength dispersion direction of the MEMS mirror.

Here, the ITU grid wavelength GW is a wavelength standardized by the International Communication Association. As depicted in FIG. 17, the band displacement becomes zero where a wavelength dispersion direction center line MC of the MEMS mirror 5 and a wavelength dispersion direction center BC of the beam B by the corresponding ITU grid wavelength coincide with each other, and the band displacement D increases as the displacement amount increases.

Figure 19:
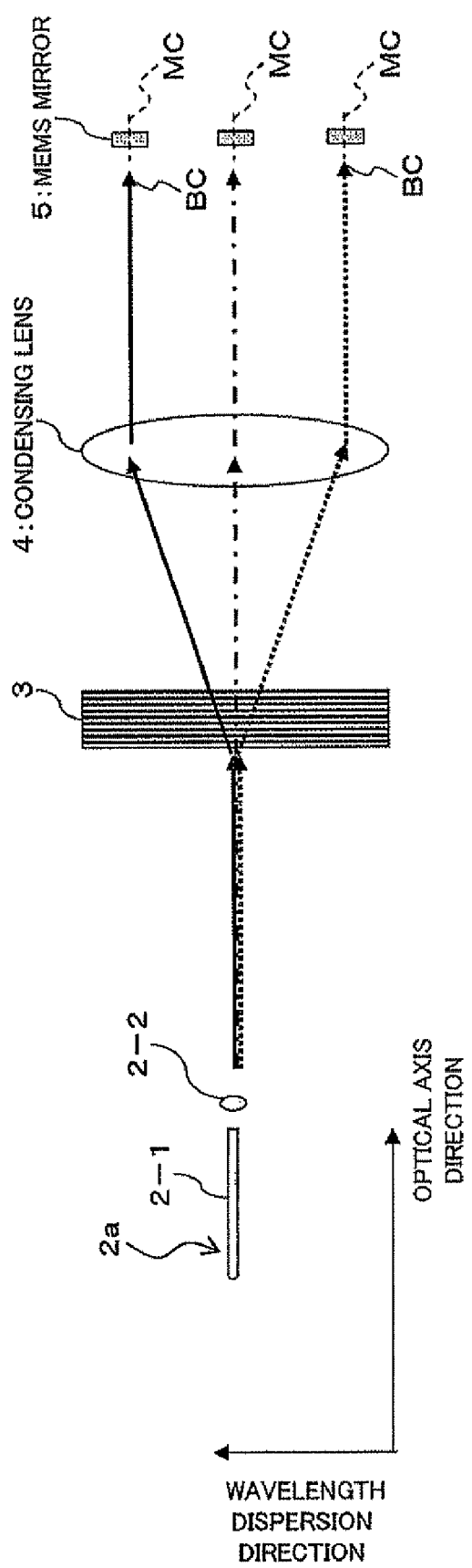
FIG. 19 is a view illustrating design of the MEMS mirror.

Therefore, the MEMS mirrors 5 arrayed in the wavelength dispersion direction are precisely arranged such that the wavelength dispersion direction center BC in the beam of each ITU grid wavelength and the wavelength dispersion direction center MC of the corresponding MEMS mirror 5 coincide with each other, for example, as seen in FIG. 19. It is to be noted that such arrangement of the MEMS mirror 5 as described above can be determined by the geometrically optical analysis using the dispersion angle of the diffraction grating which forms the spectral element 3, the focal distance of the condensing lens which forms the condensing optical system 4 and so forth as parameters.

Figure 22:
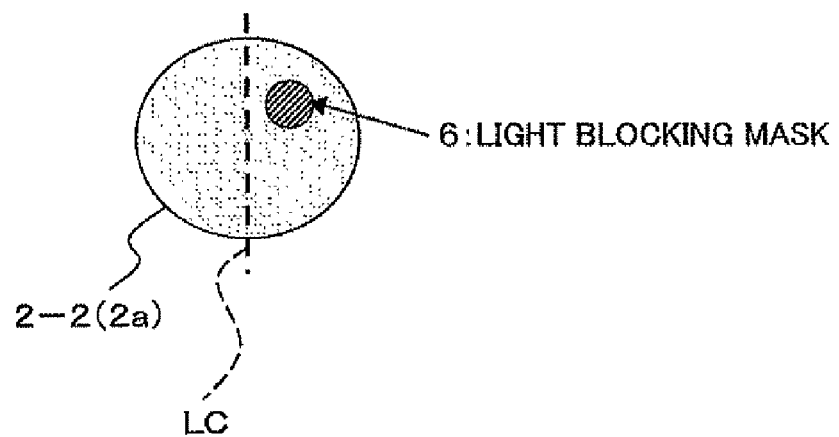
FIG. 22 is a view depicting an example of arrangement of the light blocking mask.
Figure 23:
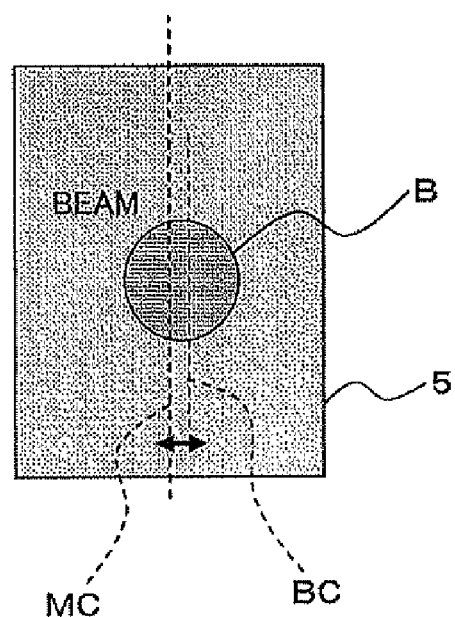
FIG. 23 is a view illustrating a beam position on the MEMS mirror according to the arrangement of the light blocking mask depicted in FIG. 22.

However, for example, if the light blocking mask 6 is provided in an asymmetric relationship with respect to the wavelength dispersion direction center LC on the microlens 2-2 as depicted in FIG. 22, then also the shape of the beam B on the MEMS mirror 5 becomes an asymmetric shape with respect to the wavelength dispersion direction (in particular, becomes an asymmetric shape with respect to the center line MC) as seen in FIG. 23. Therefore, since the wavelength dispersion direction center BC of the beam is displaced from the center line MC of the MEMS mirror 5, such band displacement D as described above with reference to FIG. 18 appears.

Figure 20:
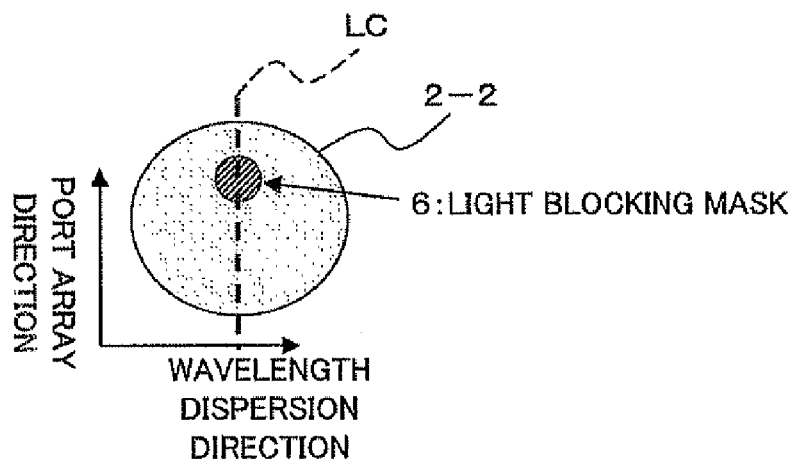
FIG. 20 is a view depicting an example of arrangement of the light blocking mask.
Figure 21:
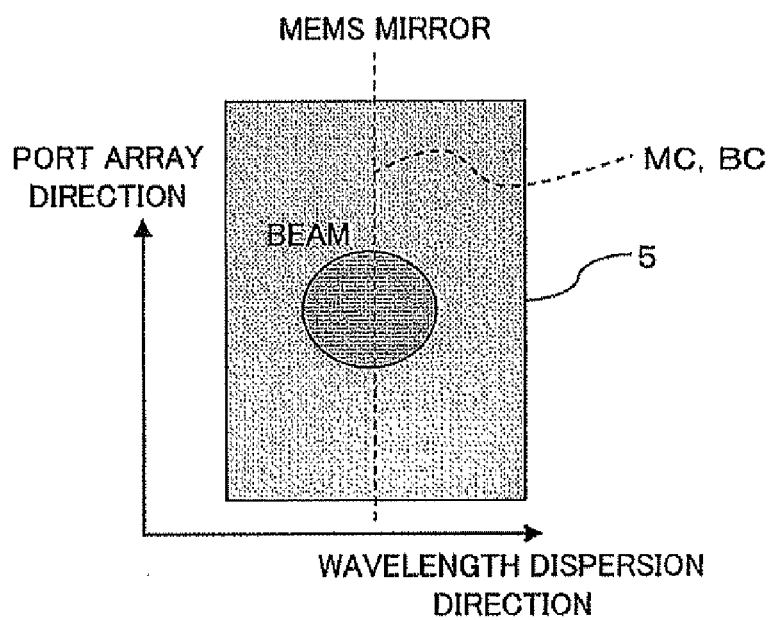
FIG. 21 is a view illustrating a beam position on the MEMS mirror according to the arrangement of the light blocking mask depicted in FIG. 20.

For example, if the light blocking mask 6 is arranged symmetrically with respect to the wavelength dispersion direction center line LC on the microlens 2-2 as depicted in FIG. 20, then appearance of the band displacement D can be avoided as depicted in FIG. 21 and a good characteristic as the wavelength selection switch 1 can be implemented.

Accordingly, such a light blocking mask 6 (masks 6a and 6b) as depicted in FIG. 12 or 14 is arranged symmetrically with respect to the wavelength dispersion direction center line LC on the microlens 2-2. Then, the position at which the mask 6 is formed is adjusted in the port array direction corresponding to a direction substantially perpendicular to the wavelength dispersion direction and the light propagation direction. Consequently, the transmission wavelength characteristic can be flattened while securing the good characteristic as the wavelength selection switch 1.

Figure 24:
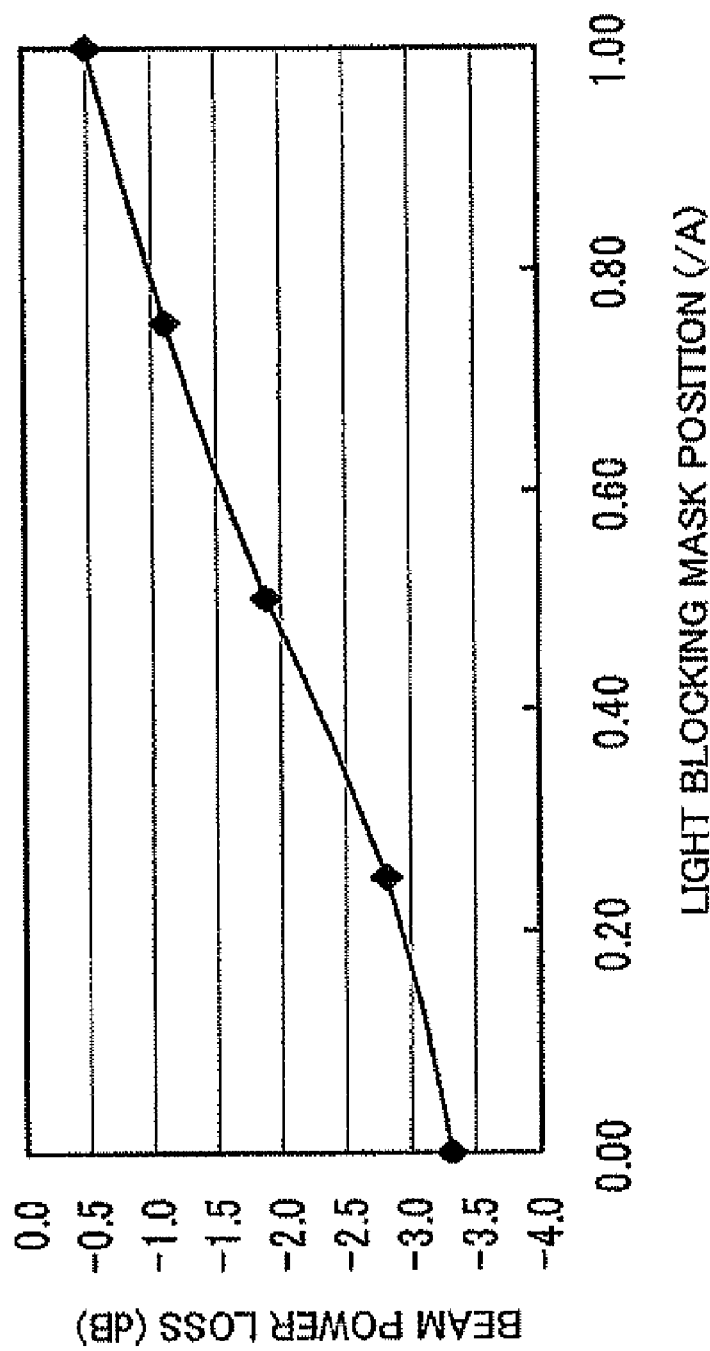
FIG. 24 is a view illustrating the loss of the beam power corresponding to the arrangement of the light blocking mask.

Now, the loss amount of a beam which reaches the MEMS mirror 5 (or is coupled to the output port 2b) where the formation position of the light blocking mask 6 (masks 6a, 6b) is varied in the port array direction is studied. FIG. 24 is a view illustrating a relationship of the loss of the beam power described above in the case of the calculation example of the beam size described hereinabove with reference to FIGS. 12 and 13. As seen in FIG. 24, the loss of the beam power increases as the formation position of the light blocking mask 6 on the micro lens 2-2 approaches the center in the port array direction in a state wherein the formation position is left at the center in the wavelength dispersion direction.

It can be assumed that the input light passing through the microlens 2-2 is a Gaussian beam. Then, the power of the Gaussian beam is concentrated at or around the center of the Gaussian beam. Further, the power of the Gaussian beam is concentrated at the center of the microlens 2-2 (in particular, at the center in the wavelength dispersion direction and the port array direction). Accordingly, if the light blocking mask 6 is formed at a position of the spherical face of the microlens 2-2 at which the power of the Gaussian beam is concentrated, then also the loss of the beam power is high.

Therefore, it is desirable to form the light blocking mask 6 at a position symmetrical with respect to the wavelength dispersion direction but in a displaced relationship from the center in the port array direction. In particular, the light blocking mask 6 is formed such that the center of the mask 6 and the center of the microlens 2-2 (in particular, the center of the beam) do not coincide with each other to avoid increase of the loss. Also in this instance, the beam size on the MEMS mirror 5 can be set to a desired size.

According to the first embodiment, the light blocking mask 6 is provided on the spherical face of the microlens 2-2 which forms the input port 2a. Consequently, since the size of a beam on the MEMS mirror 5 can be varied without the limitation of the geometrical optical lateral magnification, the degree of freedom in design of the optical system can be enhanced. Further, also there is an advantage that a ripple in the transmission wavelength characteristic can be reduced, that is, the optical characteristic can be improved.

It is to be noted that, while the microlens 2-2 in the first embodiment described above is applied as a collimation optical member on the input and output end sides, the present invention is not limited to this. For example, also such a radial type graded index (GRIN; GRaded INdex) lens 2-3 as depicted in FIG. 25 can be applied as the lens for collimating a beam from the optical fiber 2-1.

Figure 25:
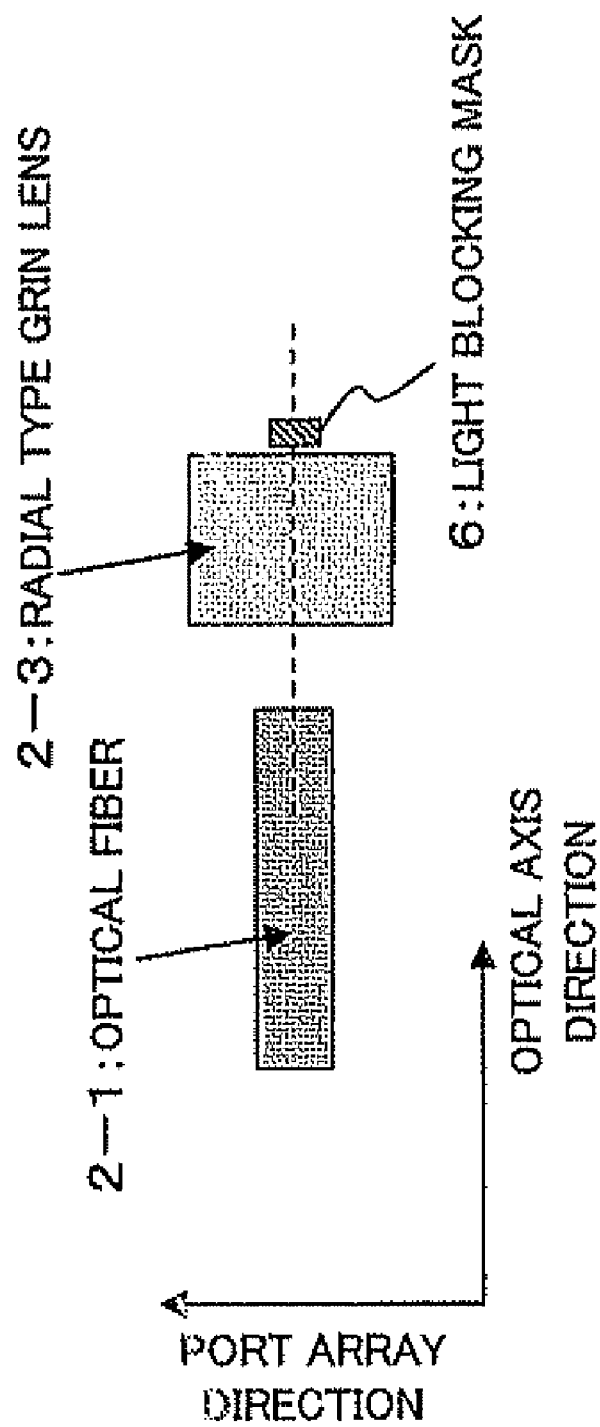
FIG. 25 is a view depicting a modification to the first embodiment.

In particular, FIG. 25 is a view depicting a modification to the first embodiment wherein the GRIN lens 2-3 described above on which the light blocking mask 6 is formed is applied as an input end side collimation optical member. It is to be noted that, in FIG. 25, illustration of the members other than the optical fiber 2-1 and the GRIN lens 2-3 is omitted. Here, the GRIN lens 2-3 is a cylindrical lens having a diffraction index distribution in the radial direction thereof, and both of the output and input faces of the GRIN lens 2-3 are flat faces.

As depicted in FIG. 25, the light blocking lens 6 is formed on the output face on the spectral element 3 side (refer to FIGS. 1(a) and 2(b)) so as to have such a position, a size and a range that the beam is varied within a range wherein the loss amount of a beam inputted to the MEMS mirror 5 is comparatively suppressed, and is formed.

Figure 26:
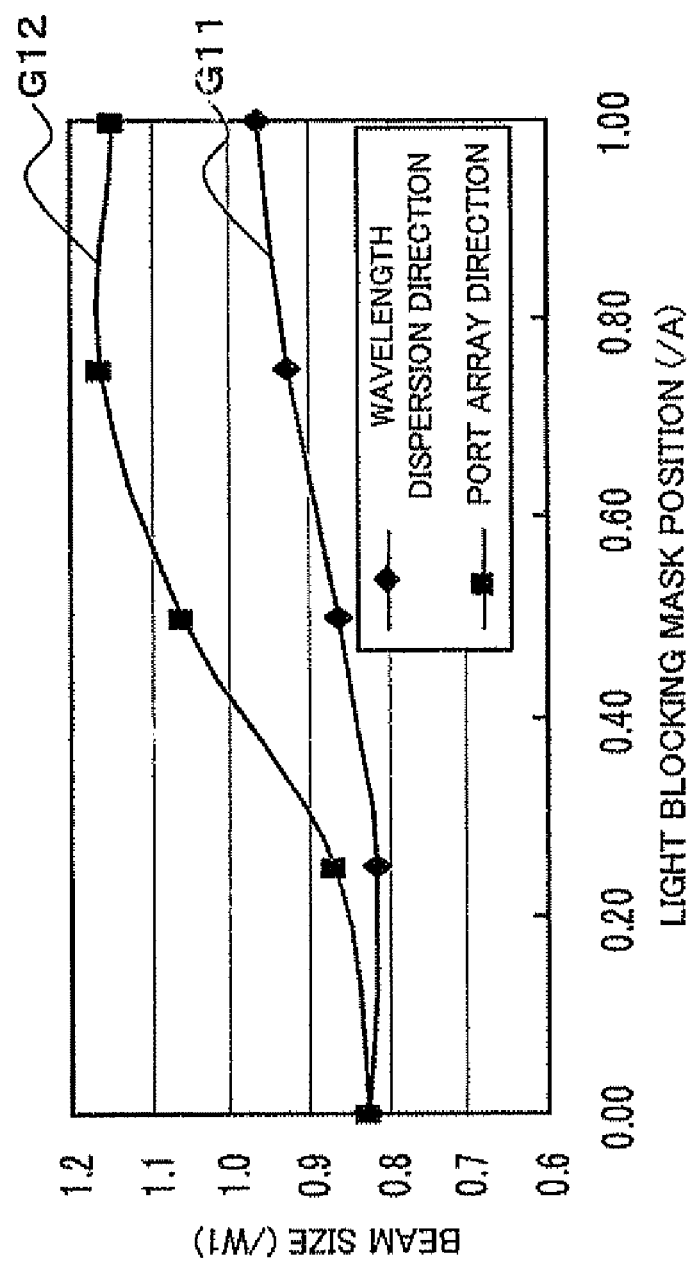
FIG. 26 is a view illustrating a working effect of the modification to the first embodiment of the present invention.

FIG. 26 is a view illustrating an example of a result of calculation relating to the beam size on the MEMS mirror 5 corresponding to the formation position of the light blocking mask 6 (whose diameter is A mm) formed on the GRIN lens 2-3 in the wavelength dispersion direction and obtained based on the beam propagation analysis method similarly as in the case of FIG. 13. It is to be noted that, similarly as in the case of FIG. 1(a), the wavelength dispersion direction is a direction wherein light having various wavelength components is spread by spectralization by the spectral element 3.

Here, in FIG. 26, the abscissa axis of the graph indicates the movement amount of the GRIN lens 2-3 of the light blocking mask 6 from the central position as a ratio to the light blocking mask diameter A. Meanwhile, the ordinate axis of the graph indicates the beam size in the wavelength dispersion direction (G11) and the port array direction (G12) as a ratio to the beam diameter W1 on the MEMS mirror 5 where no light blocking mask exists.

As depicted in FIG. 26, in comparison with the alternative case wherein the light blocking mask 6 is not formed on the GRIN lens 2-3, the beam diameter on the MEMS mirror 5 can be varied by forming the light blocking mask 6 and suitably moving the formation position of the mask 6 in the wavelength dispersion direction.

[B] Second Embodiment

In the second embodiment, an example is described wherein the light blocking mask 6 in the first embodiment is disposed at a place other than that on the spherical face of the microlens 2-2. In particular, the light blocking mask 6 can be provided at a place of an optical path from the end of the optical fiber 2-1 of the input port 2a which forms the optical input end to the MEMS mirror 5. Further, also in this instance, similarly as in the first embodiment, the beam size on the MEMS mirror 5 can be varied irrespective of the geometrical optical lateral magnification. Therefore, an advantage similar to that of the first embodiment described above can be achieved.

Figure 27:
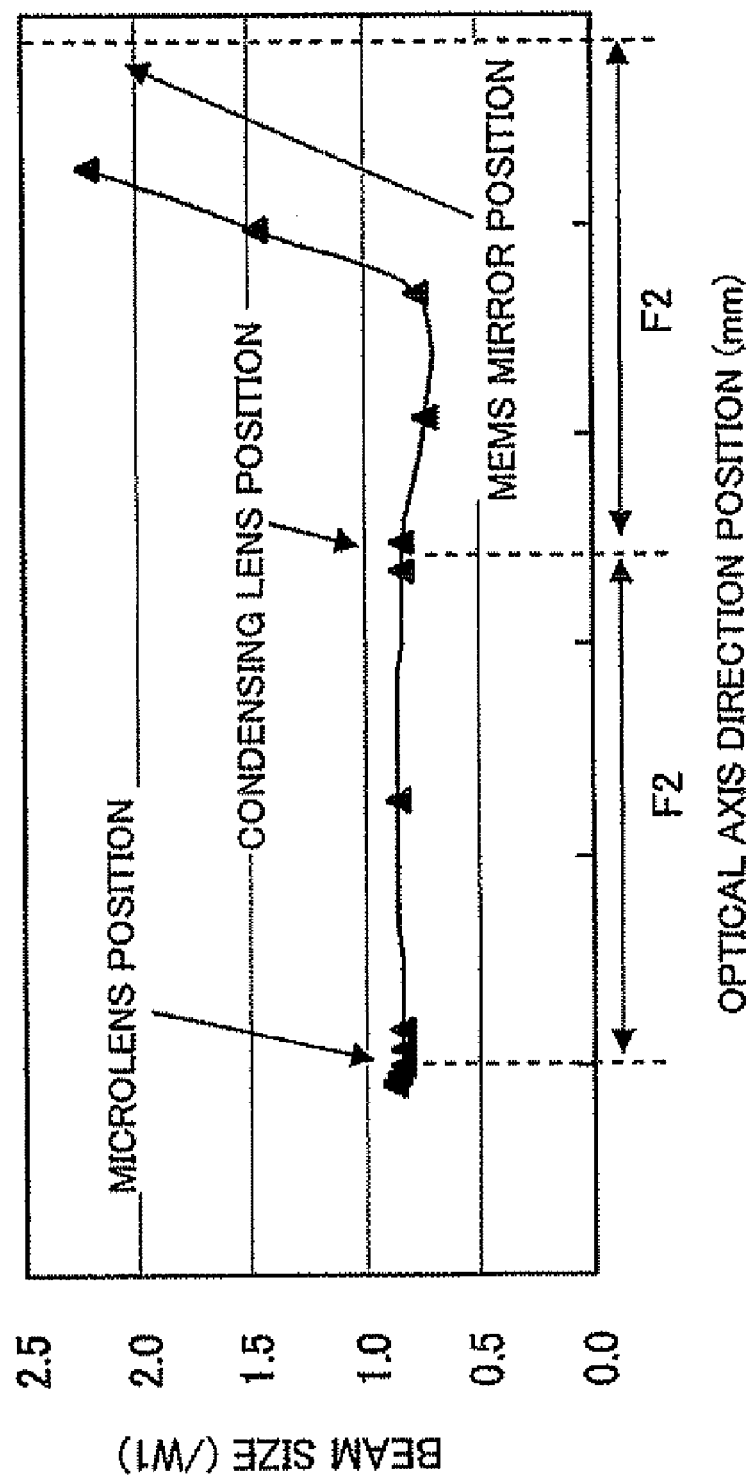
FIGS. 27 and 28 are views illustrating a second embodiment of the present invention.
Figure 28:
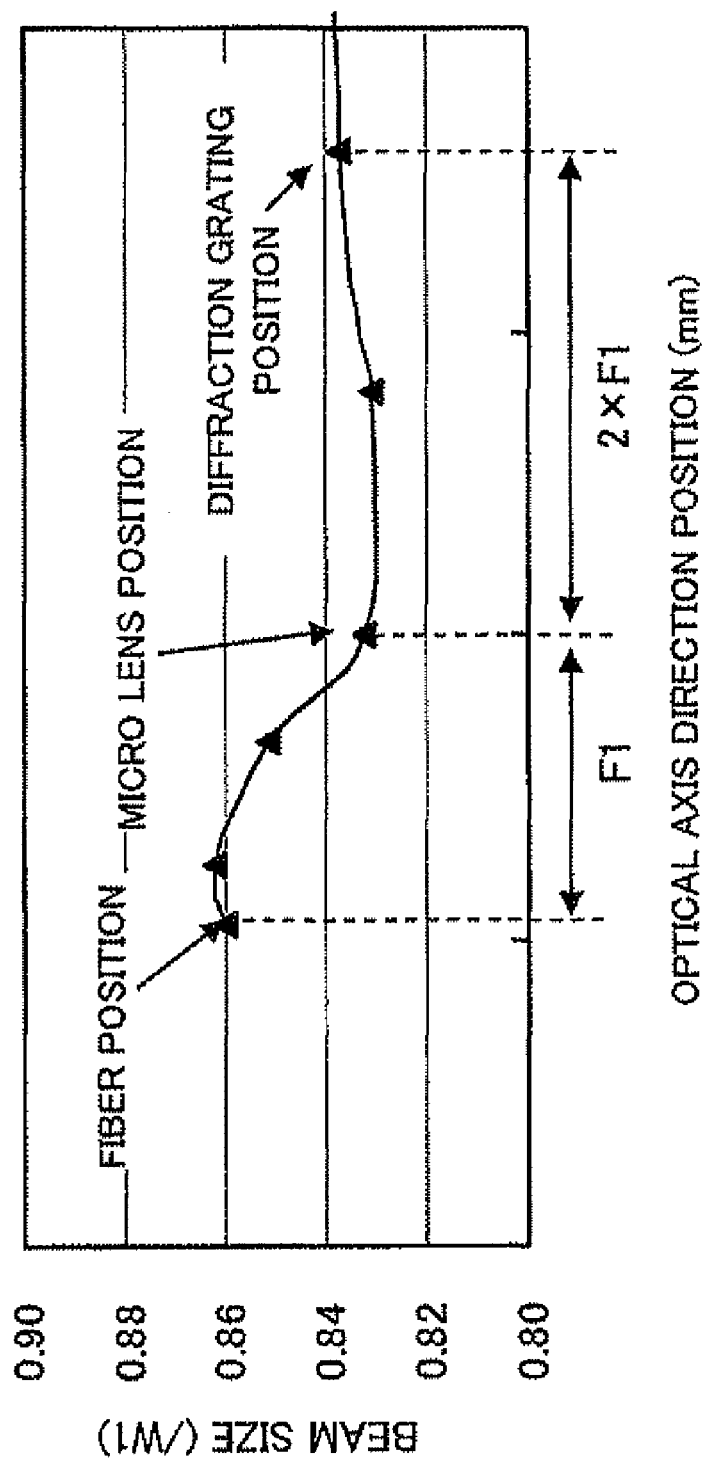

FIG. 27 is a view illustrating a variation (ordinate axis) of the beam size in the port array direction where the light blocking mask 6 is provided at some position in a light axis direction (abscissa axis) from the optical fiber 2-1 which forms the input port 2a (refer to FIG. 1(b)) to the MEMS mirror 5. Meanwhile, FIG. 28 is an enlarged view of part of FIG. 27 particularly taking notice of a variation (ordinate axis) of the beam size where the range (abscissa axis) from the end of the optical fiber 2-1 to the spectral element 3 is determined as a disposition place of the light blocking mask 6. FIGS. 27 and 28 indicate a variation amount of the beam size as a ratio to the beam size W1 on the MEMS mirror 5 where the light blocking mask is not provided.

It is to be noted that, in FIGS. 27 and 28, as a premise, the light blocking mask 6 and the center of a beam propagating in the mask 6 are made coincide with each other and the shape of the light blocking mask 6 is determined as a circular form. Further, the size of the light blocking mask is adjusted such that, together with variation of the beam size at the position in the light axis direction, the beam power after passing through the light blocking mask is constant irrespective of the position in the light axis direction.

Here, since the beam is parallel light between the output side of the microlens 2-2 and the condensing optical system 4 as depicted in FIGS. 27 and 28, the beam size on the MEMS mirror 5 is substantially fixed even if the light blocking mask is formed within the interval just described. However, since the beam is diffused light between the optical fiber 2-1 and the microlens 2-2 and between the condensing optical system 4 and the MEMS mirror 5, the light amount variation is great where the light blocking mask is formed within the intervals described above.

Therefore, from a point of view of the stability of the installation position and the size of the light blocking mask against the error, it is particularly preferable to form the light blocking mask on the optical path from the output side of the microlens 2-2 to the condensing lens 4. Where the light blocking mask is not provided on the optical elements 2-2, 3 and 4, a transparent glass plate on which the light blocking mask is formed may be provided on the optical path.

Figure 29:
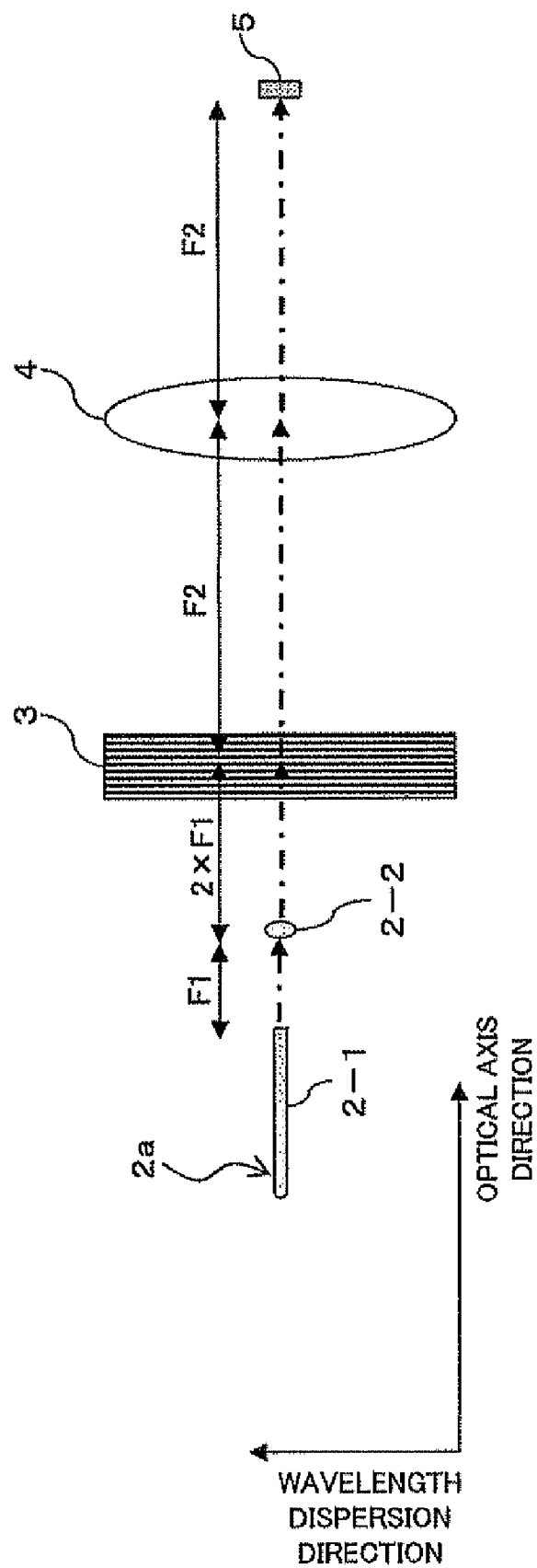
FIG. 29 is a view depicting arrangement of optical members which compose a wavelength selection switch in the second embodiment.

It is to be noted that the optical members 2-1, 2-2 and 3 to 5 in the optical axis direction at this time are arranged as in such a mode as depicted in FIG. 29. In particular, the distance from an end of the optical fiber 2-1 to the microlens 2-2 is determined to F1 and the distance from the microlens 2-2 to the spectral element 3 is determined to 2×F1. Further, both of the distance between the spectral element 3 and the condensing optical system 4 and the distance between the condensing optical system 4 and the MEMS mirror 5 are determined to F2. It is to be noted that F1 and F2 represent the focal distance of the microlens 2-2 and the focal distance of the condensing optical system 4, respectively.

Figure 30:
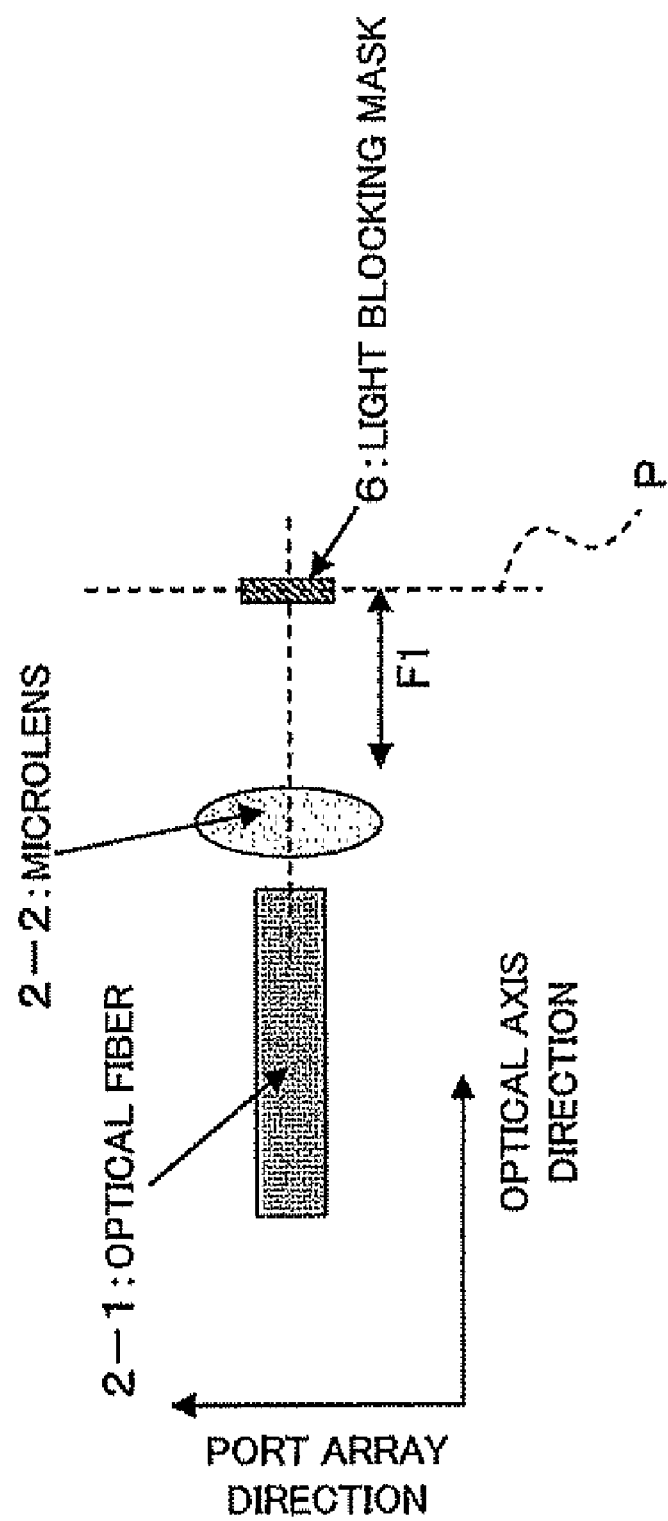
FIG. 30 is a view depicting a first mode in the second embodiment.

As an example where the light blocking mask 6 is formed at a place other than that on the spherical face of the microlens 2-2, the light blocking mask 6 can be formed between the microlens 2-2 and the spectral element 3, for example, as depicted in FIG. 30. In the case depicted in FIG. 30, the light blocking mask 6 is provided at a microlens focal position after light from the optical fiber 2-1 passes through the microlens 2-2. In the light blocking mask 6 in this instance, a transparent glass plate on which such a light blocking mask as described above is formed can be provided as the light blocking mask member.

Then, in the light blocking mask 6 provided at such a place as described above, by adjusting the formation position of the light blocking mask 6 on a plane perpendicular to the beam passing through the place, the beam diameter on the MEMS mirror 5 can be varied similarly as in the first embodiment described above.

Figure 31:
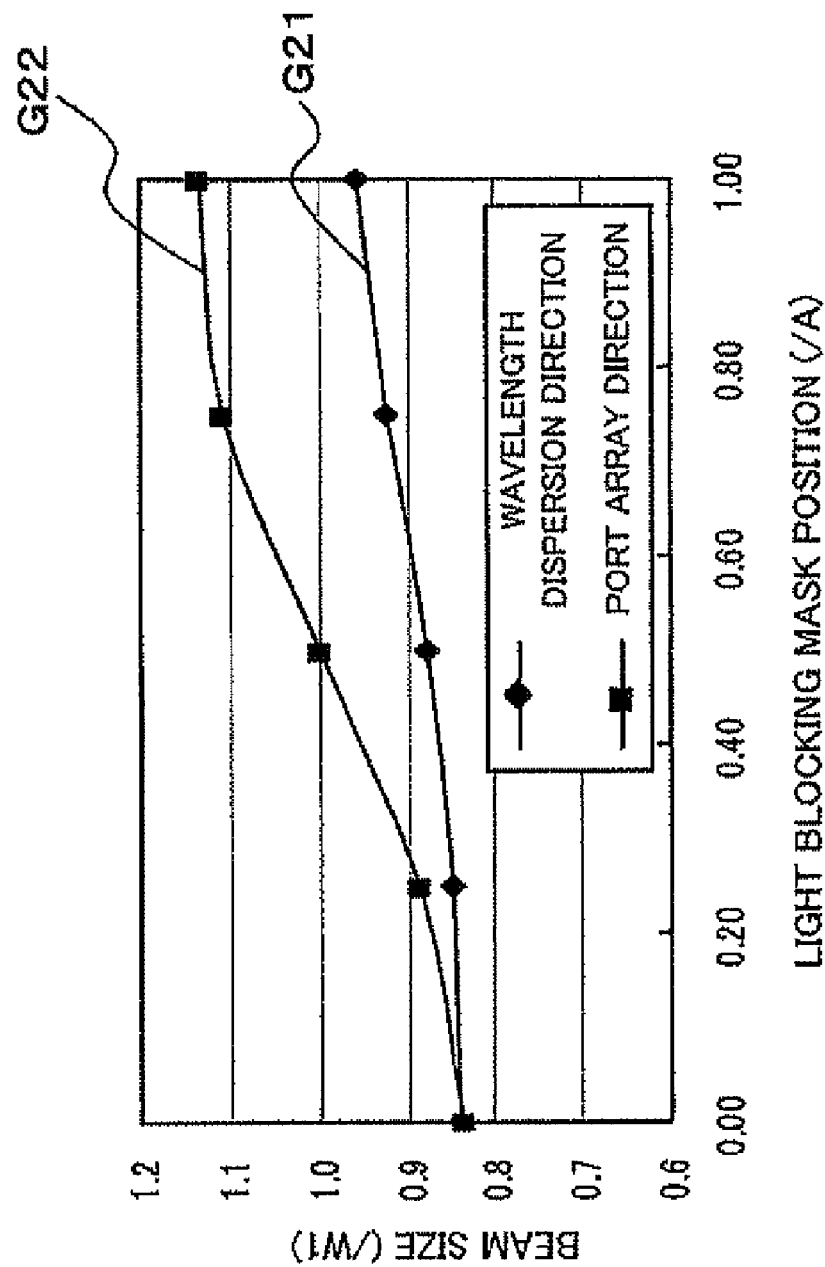
FIG. 31 is a view illustrating a working effect of the first mode depicted in FIG. 30.

FIG. 31 is a view illustrating a relationship of the beam size on the MEMS mirror 5 to the position of the light blocking mask 6 (whose diameter is A mm) on a beam passing plane P where the light blocking mask 6 is formed at the place depicted in FIG. 30. In particular, FIG. 31 illustrates an example of a result of calculation obtained based on the beam propagation analysis similarly as in the case in FIG. 13 regarding the beam size on the MEMS mirror 5 corresponding to the formation position of the light blocking mask 6 in the wavelength dispersion direction.

Here, the abscissa axis depicted in FIG. 31 indicates the movement amount of a beam from the central position in the wavelength dispersion direction on the beam passing plane P as a ratio to the light blocking mask diameter A. The ordinate axis depicted in FIG. 31 indicates the beam sizes in the wavelength dispersion direction (G21) and the port array direction (G22) as a ratio to the beam diameter W1 on the MEMS mirror 5 where there is no light blocking mask.

Also in such a case that the light blocking mask 6 is formed as depicted in FIG. 30, a working effect similar to that of the first embodiment can be achieved. In particular, in comparison with the alternative case wherein the light blocking mask 6 is not formed, the beam diameter on the MEMS mirror 5 can be varied by forming such a light blocking mask 6 as depicted in FIG. 31 at a place which is a focal position and suitably moving the formation range of the mask 6 in the wavelength dispersion direction on the beam passing plane P.

Figure 32:
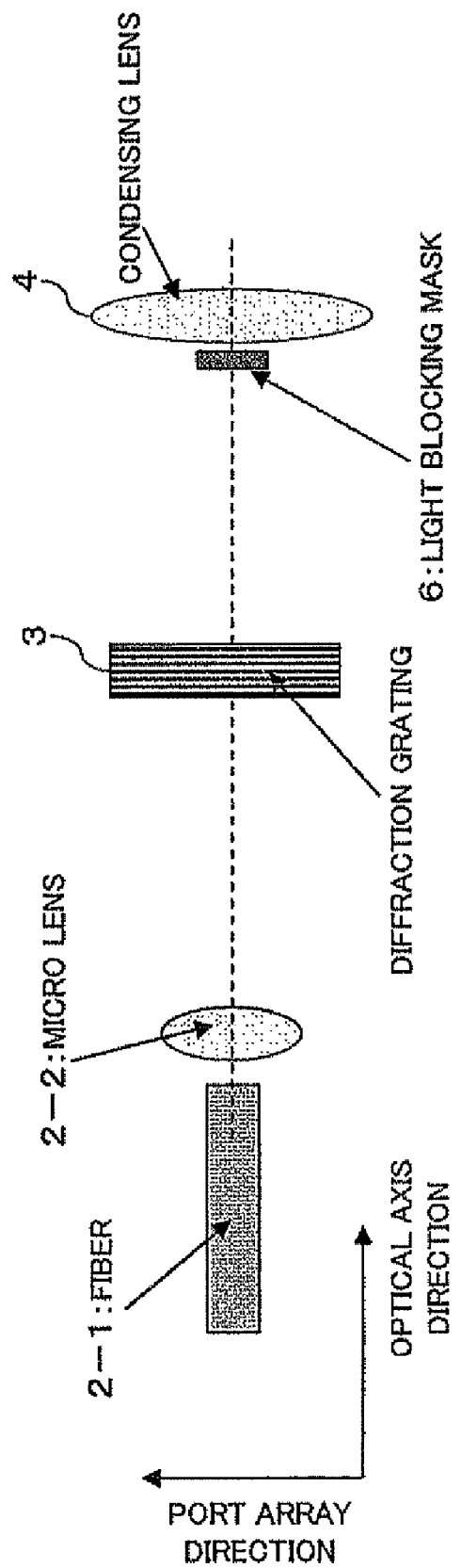
FIG. 32 is a view depicting a second mode in the second embodiment.

As a different example wherein the light blocking mask 6 is disposed at a place other than that on the spherical face of the microlens 2-2 the light blocking mask 6 may be formed on the condensing lens 4 (for example, on the input face thereof) which configures the condensing optical system, for example, as seen in FIG. 32.

Further, in the light blocking mask 6 provided such a place as described above, by adjusting the formation place of the mask 6 on the lens face of the condensing lens 4, the beam diameter on the MEMS mirror 5 can be varied similarly as in the first embodiment described above.

Figure 33:
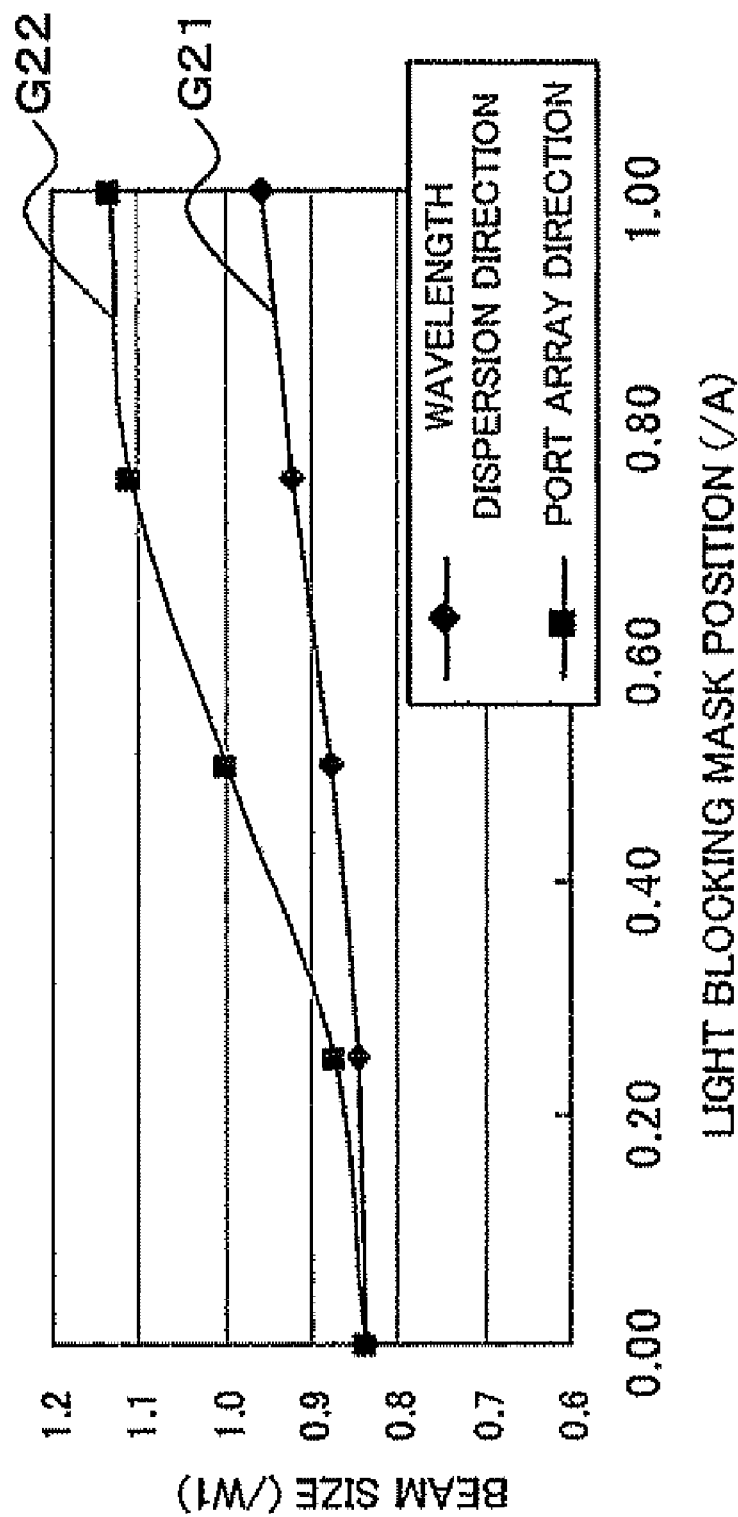
FIG. 33 is a view illustrating a working effect of the second mode depicted in FIG. 32.

FIG. 33 is a view illustrating a relationship of the beam size on the MEMS mirror 5 to the position of the light blocking mask 6 (whose diameter is A mm) on the lens face of the condensing lens 4 where the light blocking mask 6 is formed on the condensing lens 4. In particular, FIG. 33 illustrates a result of calculation obtained based on the beam propagation method similar to that of the case in FIG. 13 regarding the beam size on the MEMS mirror 5 corresponding to the formation position of the light blocking mask 6 in the wavelength dispersion direction.

Here, the abscissa axis depicted in FIG. 33 indicates a coordinate of the formation place of the light blocking mask 6 on the lens face of the condensing lens 4 which is the beam passing plane. Here, the movement amount of the light blocking mask 6 in the wavelength dispersion direction from the central position of a passing beam is indicated as a ratio to the light blocking mask diameter A. Further, the ordinate axis depicted in FIG. 33 indicates the beam sizes in the wavelength dispersion direction (G21) and the port array direction (G22) corresponding to the formation place of the light blocking mask on the lens face described above as a ratio to the beam diameter W1 on the MEMS mirror 5 where there is no light blocking mask 6.

Also in such a case that the light blocking mask 6 is provided as depicted in FIG. 32, a working effect similar to that of the first embodiment can be achieved. In particular, as depicted in FIG. 33, in comparison with the alternative case wherein the light blocking mask 6 is not formed, the beam diameter on the MEMS mirror 5 can be varied by forming the light blocking mask 6 on the condensing lens 4 and suitably moving the formation range of the mask 6 in the wavelength dispersion direction on the condensing lens face.

FIGS. 34(a) and 34(b) are views depicting a wavelength selection switch 1B according to a modification to the second embodiment. In particular, FIG. 34(a) is a top plan view of the wavelength selection switch 1B and FIG. 34(b) is a side elevational view of the wavelength selection switch 1B. In the wavelength selection switch 1B depicted in FIGS. 34(a) and 34(b), different from the wavelength selection switch 1 depicted in FIGS. 1(a) and 1(b), an anamorphic prism 7 is interposed between the microlens 2-2 and the spectral element 3.

Since the anamorphic prism 7 is provided in the wavelength selection switch 1B, the shape of a beam on the MEMS mirror 5 can be adjusted to an elliptical shape. A pair of cylindrical lenses can be also applied in place of the anamorphic prism 7. In particular, by interposing a beam enlarging optical system for enlarging the beam size only in one direction like the anamorphic prism 7 or paired cylindrical lenses described above, the shape of a beam on the MEMS mirror 5 can be adjusted to an elliptical shape.

Further, the light blocking mask 6 may be provided in such a beam enlarging optical system as described above. The light blocking mask 6 having a function similar to that in the case described above is formed on the anamorphic prism 7 (here, on a light input face from the microlens 2-2). Consequently, also in the wavelength selection switch depicted in FIGS. 34(a) and 34(b), the beam diameter on the MEMS mirror 5 can be varied by the light blocking mask 6 and an advantage similar to that of the first embodiment described above can be achieved.

[C] Third Embodiment

FIG. 35 is a view depicting an optical apparatus according to the third embodiment. The optical apparatus 10 depicted in FIG. 35 includes an optical fiber 2-1, a microlens 2-2 as a collimate optical system for collimating a beam from the optical fiber 2-1 and a condensing optical system 3 for condensing a beam from the collimate optical system 2-2.

Also in such an optical apparatus 10 as just described, if it is assumed that the light blocking mask 6 is not formed, then the beam size on the condensing plane of the condensing optical system 3 is limited to F2/F1 which indicates the geometrical optical lateral magnification as described above. However, by forming the light blocking mask 6 in an optical path range from the output end of the optical fiber 2-1 to the condensing plane of the condensing optical system 3, the beam diameter on the condensing lens can be varied and the degree of freedom in design of the optical system can be improved as described hereinabove.

Further, since the light blocking mask 6 is formed within the range of the optical path from the output side of the microlens 2-2 to the condensing optical system 4 so as to be provided at a place within a substantially parallel light range, also the loss of a beam on the condensing plane can be suppressed in comparison with an alternative case wherein the mask 6 is provided at a different place of the optical path range. Since the light blocking mask 6 is provided just near to the output side of the microlens 2-2 (typically provided on the output face of the microlens 2-2) in FIG. 35, the beam diameter can be varied while suppressing the loss on the condensing plane.

Also the formation place of the light blocking mask 6 on the beam passing plane can be suitably adjusted similarly as in the embodiments described above.

Consequently, since the beam diameter on the condensing plane can be adjusted not only in the wavelength selection switch but also in the optical apparatus 10 including the collimate optical system 2 and the condensing optical system 3 in the third embodiment, the degree of freedom in design of the optical system can be increased similarly as in the embodiments described above.

It is to be noted that, while a case wherein the light blocking mask 6 has a circular shape is described in the embodiments described above, since naturally a beam wavefront can be distorted even if a different shape such as an elliptical shape, a polygonal shape or the like is applied to the light blocking mask 6, an effect similar to that of the embodiments described above can be achieved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. An optical apparatus, comprising:
a first lens adapted to collimate and output incident light;
a second lens adapted to condense the light from said first lens; and
a light blocking mask member provided at a point on an optical path of the incident light and adapted to provide distortion to a beam wavefront after outputted from said first lens by blocking part of the incident light, wherein said light blocking mask member is provided at a position within a range substantially twice a Gaussian beam diameter of the light at the point.

2. The optical apparatus as claimed in claim 1, wherein said light blocking mask member is provided at a position at which the center of said light blocking mask member and the beam center of the incident light are displaced from each other on a transmission plane of the input light at the point.

3. The optical apparatus as claimed in claim 1, wherein said light blocking mask member is provided at a point of the optical path from said first lens to said second lens.

4. The optical apparatus as claimed in claim 3, wherein said light blocking mask member is provided on said first lens.

5. The optical apparatus as claimed in claim 3, wherein said light blocking mask member is provided on said second lens.

6. The optical apparatus as claimed in claim 1, further comprising a prism or a pair of fourth lenses interposed between said first lens and said second lens and adapted to increase the beam diameter in a particular direction of the light collimated by said first lens.

7. The optical apparatus as claimed in claim 6, wherein said light blocking mask member is provided on said prism or said pair of fourth lenses.

8. The optical apparatus as claimed in claim 1, further comprises:
   a diffraction grating adapted to spectralize the light collimated by said first lens and output the resulting light to said second lens; and
   a plurality of mirrors adapted to reflect the light condensed by said second lens in accordance with the wavelength each at an angle which is variably settable; wherein
   said light blocking mask member being provided at a point of the optical path from light input ends to said mirrors.

9. The optical apparatus as claimed in claim 8, wherein said light blocking mask member is provided at each of substantially line-symmetrical positions with respect to a substantial bisector in a spectroscopic direction by said diffraction grating on a transmission plane of the light at the point.

10. The optical apparatus as claimed in claim 8, further comprising a third lens adapted to receive the reflection light reflected by said mirrors and inputted through said second lens and said diffraction grating and introduce the reflection light to a light output end.

11. The optical apparatus as claimed in claim 10, wherein said third lens is provided corresponding to an optical axis of the reflection light defined in accordance with the reflection angle of said mirror.

12. The optical apparatus as claimed in claim 11, wherein said first lens and said third lens are arrayed in a direction different from the spectroscopic direction by said diffraction grating.

13. The optical apparatus as claimed in claim 12, wherein said light blocking mask member has, on a transmission plane of light at the point, a line-symmetrical shape in the spectroscopic direction by said diffraction grating and the center of said light blocking mask member is provided at a position displaced from the transmission center of the light in the array direction of said first lens and said third lens.

14. An optical transmission apparatus, comprising:
   an optical apparatus comprising a first lens adapted to collimate and output incident light, a second lens adapted to condense the light from said first lens, and a light blocking mask member provided at a point on an optical path of the incident light and adapted to provide distortion to a beam wavefront after outputted from said first lens by blocking part of the incident light, wherein said light blocking mask member is provided at a position within a range substantially twice a Gaussian beam diameter of the light at the point.

* * * * *